US012674615B2

(12) United States Patent
Lim et al.

(10) Patent No.: US 12,674,615 B2
(45) Date of Patent: Jul. 7, 2026

(54) REFRIGERATOR

(71) Applicant: SAMSUNG ELECTRONICS CO., LTD., Suwon-si (KR)

(72) Inventors: Suhyeong Lim, Suwon-si (KR); Donghyeon Kwak, Suwon-si (KR); Jaejin Lee, Suwon-si (KR); Hojune Jeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 78 days.

(21) Appl. No.: 18/745,128

(22) Filed: Jun. 17, 2024

(65) Prior Publication Data

US 2025/0075964 A1 Mar. 6, 2025

Related U.S. Application Data

(63) Continuation of application No. PCT/KR2024/007471, filed on May 31, 2024.

(30) Foreign Application Priority Data

Sep. 1, 2023 (KR) ........................ 10-2023-0116468
Nov. 8, 2023 (KR) ........................ 10-2023-0154029

(51) Int. Cl.
*F25D 23/02* (2006.01)
*E05B 15/04* (2006.01)
(Continued)

(52) U.S. Cl.
CPC ........ *F25D 23/028* (2013.01); *E05B 47/0012* (2013.01); *E05B 57/00* (2013.01); *E05B 2015/0413* (2013.01); *E05Y 2900/31* (2013.01)

(58) Field of Classification Search
None
See application file for complete search history.

(56) References Cited

U.S. PATENT DOCUMENTS 8,752,918 B2 6/2014 Kang
8,844,983 B2 * 9/2014 Kang .................... F25D 23/025
292/95

(Continued)

FOREIGN PATENT DOCUMENTS

CN 112065170 A * 12/2020 ......... G07C 9/00944
EP 3 255 363 B1 3/2020

(Continued)

OTHER PUBLICATIONS

International Search Report dated Sep. 25, 2024 for International Application No. PCT/KR2024/007471.

(Continued)

*Primary Examiner* — Hanh V Tran
(74) *Attorney, Agent, or Firm* — STAAS & HALSEY LLP

(57) ABSTRACT

A refrigerator may include a body having a compartment, an inner door having an opening, and being rotatable between a closed and an open position relative to the compartment, an outer door in front of the inner door, and rotatable to open and close the opening, a locking device to lock the outer door to, and unlock the outer door from, the inner door, and an input unit to receive a user input to unlock the outer door, wherein the locking device includes a latch that is rotatable between a locked and unlocked position, a lever configured to be manually manipulatable with a manipulation force by the user so that the latch rotates from the locked to the unlocked position, and a driving source configured to, based on the user input, apply a force so that the latch rotates from the locked to the unlocked position.

14 Claims, 21 Drawing Sheets

(51) Int. Cl.

| | |
|---|---|
| ***E05B 47/00*** | (2006.01) |
| ***E05B 57/00*** | (2006.01) |

(56) References Cited

U.S. PATENT DOCUMENTS

| | | | | |
|---|---|---|---|---|
| 9,574,818 | B2 * | 2/2017 | Choi | F25D 23/00 |
| 10,006,691 | B2 | 6/2018 | Jung | |
| 10,066,866 | B2 * | 9/2018 | Lee | E05C 3/14 |
| 10,941,973 | B2 * | 3/2021 | Kim | F25D 23/04 |
| RE48,733 | E * | 9/2021 | Oh | E05D 7/081 |
| 11,359,414 | B2 * | 6/2022 | Ayyawar | E05C 7/02 |
| 12,044,462 | B2 * | 7/2024 | Ham | E05B 65/0042 |
| 2013/0026900 | A1 * | 1/2013 | Oh | E05D 7/00 312/401 |
| 2022/0128290 | A1 * | 4/2022 | Jeon | F25D 23/025 |
| 2022/0260304 | A1 | 8/2022 | Ham et al. | |
| 2023/0069462 | A1 * | 3/2023 | Arens | E05B 47/0012 |
| 2024/0401374 | A1 * | 12/2024 | Clark | E05B 47/068 |

FOREIGN PATENT DOCUMENTS

| | | | | |
|---|---|---|---|---|
| KR | 10-1343775 | | 12/2013 | |
| KR | 10-2014-0131759 | | 11/2014 | |
| KR | 10-2014-0143016 | | 12/2014 | |
| KR | 10-2015-0099024 | | 8/2015 | |
| KR | 10-2017-0052252 | A | 5/2017 | |
| KR | 10-1768698 | B1 | 8/2017 | |
| KR | 10-1774070 | B1 | 9/2017 | |
| KR | 10-2017-0124239 | | 11/2017 | |
| KR | 10-2093456 | B1 | 5/2020 | |
| KR | 10-2021-0055887 | A | 5/2021 | |
| KR | 10-2392210 | B1 | 4/2022 | |
| WO | WO-2006088775 | A2 * | 8/2006 | E05B 79/20 |
| WO | WO-2021091067 | A1 * | 5/2021 | E05C 9/16 |

OTHER PUBLICATIONS

Written Opinion dated Sep. 25, 2024 for International Application No. PCT/KR2024/007471.

* cited by examiner

REFRIGERATOR

CROSS-REFERENCE TO RELATED APPLICATIONS

This is a continuation application, under 35 U.S.C. § 111 (a), of International Application PCT/KR2024/007471, filed May 31, 2024, which claims priority under 35 U.S.C. § 119 to Korean Patent Application No. 10-2023-0116468, filed Sep. 1, 2023 and Korean Patent Application No. 10-2023-0154029, filed Nov. 8, 2023, in the Korean Intellectual Property Office, the disclosures of which are incorporated herein in their entireties by reference.

TECHNICAL FIELD

The present disclosure relates to a refrigerator, and specifically, to a structure capable of locking or unlocking a door of the refrigerator and automatically opening the door when the door is unlocked.

BACKGROUND ART

A refrigerator is an apparatus including a main body having a storage compartment, a cold air supply system provided to supply cold air to the storage compartment, and door provided to open and close the storage compartment, thereby keeping food fresh.

The door of the refrigerator may be provided to open and close the storage compartment by rotating about a rotation axis. The refrigerator may be provided with a locking structure capable of locking the door so that the door is kept in a state of being closed, or unlocking the door.

Also, the refrigerator may be provided with a structure capable of automatically opening the door.

The door of the refrigerator may include an inner door having an opening and rotatably coupled to the main body, and an outer door provided to be rotatable with respect to the inner door to open and close the opening of the inner door.

DISCLOSURE

Technical Problem

The present disclosure is directed to providing a refrigerator including a locking device capable of locking or unlocking an outer door of the refrigerator.

The present disclosure is directed to providing a refrigerator including a locking device having a manual unlocking unit capable of unlocking through a physical force of a user, and an automatic unlocking unit capable of unlocking through a driving force of a driving source.

The present disclosure is directed to providing a refrigerator including a locking device in which no load is applied to the automatic unlocking unit when the manual unlocking unit is operated.

The present disclosure is directed to providing a refrigerator including an automatic door opening structure capable of automatically opening an outer door of the refrigerator.

Technical tasks to be achieved in this document are not limited to the technical tasks mentioned above, and other technical tasks not mentioned will be clearly understood by those skilled in the art from the description below.

Technical Solution

In an aspect of the present disclosure a refrigerator may include: a main body having a storage compartment, an inner door having an opening, and being rotatable between a closed position and an open position relative to the storage compartment, an outer door in front of the inner door, and being rotatable to open and close the opening in the inner door, a locking device on the outer door to lock the outer door to, and unlock the outer door from, the inner door; and an input unit to receive a user input from a user to unlock the outer door from the inner door, wherein the locking device includes a latch that is rotatable about a latch rotation axis between a locked position in which the outer door is locked to the inner door, and an unlocked position in which the outer door is unlocked from the inner door, a lever configured to be manually manipulatable by the user so that, as the user applies a manipulation force to the lever, the latch rotates from the locked position to the unlocked position, and a driving source configured to, based on the user input being received by the input unit, apply a driving force to the latch so that, as the driving source applies the driving force to the latch, the latch rotates from the locked position to the unlocked position.

The inner door may include a fixer, the latch may include a latch body part and a latch hook part protruding from the latch body part so that the latch body part and the latch hook part rotate together about the latch rotation axis with rotation of the latch, and the fixer and the latch hook part may be configured so that, in the locked position, the latch hook part is coupled to the fixer, and in the unlocked position, the latch hook part is separated from the fixer.

The locking device may include a latch elastic member configured to elastically bias the latch to the locked position.

The driving force may be applied to an end of the latch body part, and the manipulation force may be applied to another end of the latch body part.

The locking device may include a pusher that is linearly movable along the latch rotation axis by the driving force, and a connector that is linearly movable between a base position and an advanced position by a linear movement of the pusher resulting from the driving force, and the pusher and the connector are configured so that, as the connector moves from the base position to the advanced position by the linear movement of the pusher, the connector may press the latch, so that the latch rotates from the locked position to the unlocked position.

The latch may include an inclined surface, the connector may include a connector protrusion configured to press the inclined surface, and the inclined surface may be inclined with respect to a pressing direction of the connector protrusion so that, as the connector protrusion presses the inclined surface, the latch rotates from the locked position to the unlocked position.

The latch may be rotatable from the locked position to the unlocked position without interfering with the connector when the connector is in the base position.

The latch may include an avoidance portion, and the avoidance portion may be configured so that, with the connector in the base position, the avoidance portion does not interfere with the connector protrusion as the latch is rotated from the locked position to the unlocked position by the manipulation force.

The pusher and the connector may be separable, and the locking device may further include a connector elastic member configured to elastically bias the connector to the base position.

The pusher and the connector may be integral.

The driving source may include a motor configured to generate a rotational force, the locking device may further include a rotation gear rotatable by the generated rotational force, and the pusher may include a rack gear engaged with the rotation gear, and the rotation gear and the rack gear are configured so that, as the generated rotational force rotates the rotation gear, the rack gear linearly moves in an axial direction of the latch rotation axis, and thereby linearly moves the pusher.

The driving source may include a solenoid having a plunger configured to be linearly movable by a magnetic force generated by a coil and so that a linear movement of the plunger applies the driving force to the latch.

The locking device may further include a connecting rod between the lever and the latch to transmit the manipulation force from the lever to the latch, and the connecting rod may be rotatable together with the latch about the latch rotation axis.

The connecting rod may include a rod body part, a rod extension part extending in a radial direction from the rod body part, and a connecting pin at a position eccentric from the latch rotation axis and coupled to the lever so that, as the user applies the manipulation force to the lever, the connecting pin moves and thereby applies the manipulation force to the latch.

The lever may be rotatable about a lever rotation axis perpendicular to the latch rotation axis, and the lever may include a lever shaft, a lever handle protruding from the lever shaft and configured to be manually manipulated by the user so that the lever shaft and the lever handle rotate together about the lever rotation axis with rotation of the lever handle, and a pin coupling part coupled to the connecting pin and configured so that, as the user applies the manipulation force to the lever, the pin coupling part moves the connecting pin and thereby applies the manipulation force to the latch.

In another aspect of the present disclosure a refrigerator may include a main body having a storage compartment, an inner door rotatably provided in front of the main body and having an opening, an outer door rotatably provided in front of the inner door to open and close the opening, a fixer provided on the inner door, a latch provided to be rotatable about a latch rotation axis between a locked position in which the latch is coupled to the fixer and an unlocked position in which the latch is separated from the fixer, and including a latch body part forming the latch rotation axis and a latch hook part protruding from the latch body part, a latch elastic member provided to elastically bias the latch to the locked position, an input unit provided to receive an unlock signal for unlocking the latch from a user, and a driving source configured to generate a driving force based on the unlock signal being input to the input unit so that the latch is rotatable to the unlocked position through the driving force.

The refrigerator may further include a pusher provided to move linearly along the latch rotation axis through the driving force.

The refrigerator may further include a connector provided to convert the linear movement of the pusher into rotation of the latch.

The latch may include an inclined surface, the connector may include a connector protrusion provided to press the inclined surface, and the inclined surface may be formed to be inclined with respect to a pressing direction of the connector protrusion so that the latch is rotated from the locked position to the unlocked position as the connector protrusion presses the inclined surface.

The input unit may include a touch board mounted inside the outer door to correspond to a touch region formed on a front surface of the outer door and having a touch sensor provided to detect a touch by the user.

Advantageous Effects

According to the present disclosure, when an outer door is unlocked through a locking device, the outer door can be automatically opened without any additional operation.

According to the present disclosure, a locking state of the outer door can be released by a manipulation force of a user of manipulating a lever, or the locking state of the outer door can be released by a driving force of a separate driving source.

According to the present disclosure, when the user manipulates the lever to unlock the outer door, no load can be applied to an automatic unlocking unit.

Effects obtainable from the present disclosure are not limited to the effects mentioned above, and other effects not mentioned will be clearly understood by those skilled in the art from the description below.

MODE OF THE DISCLOSURE

Figure 1:
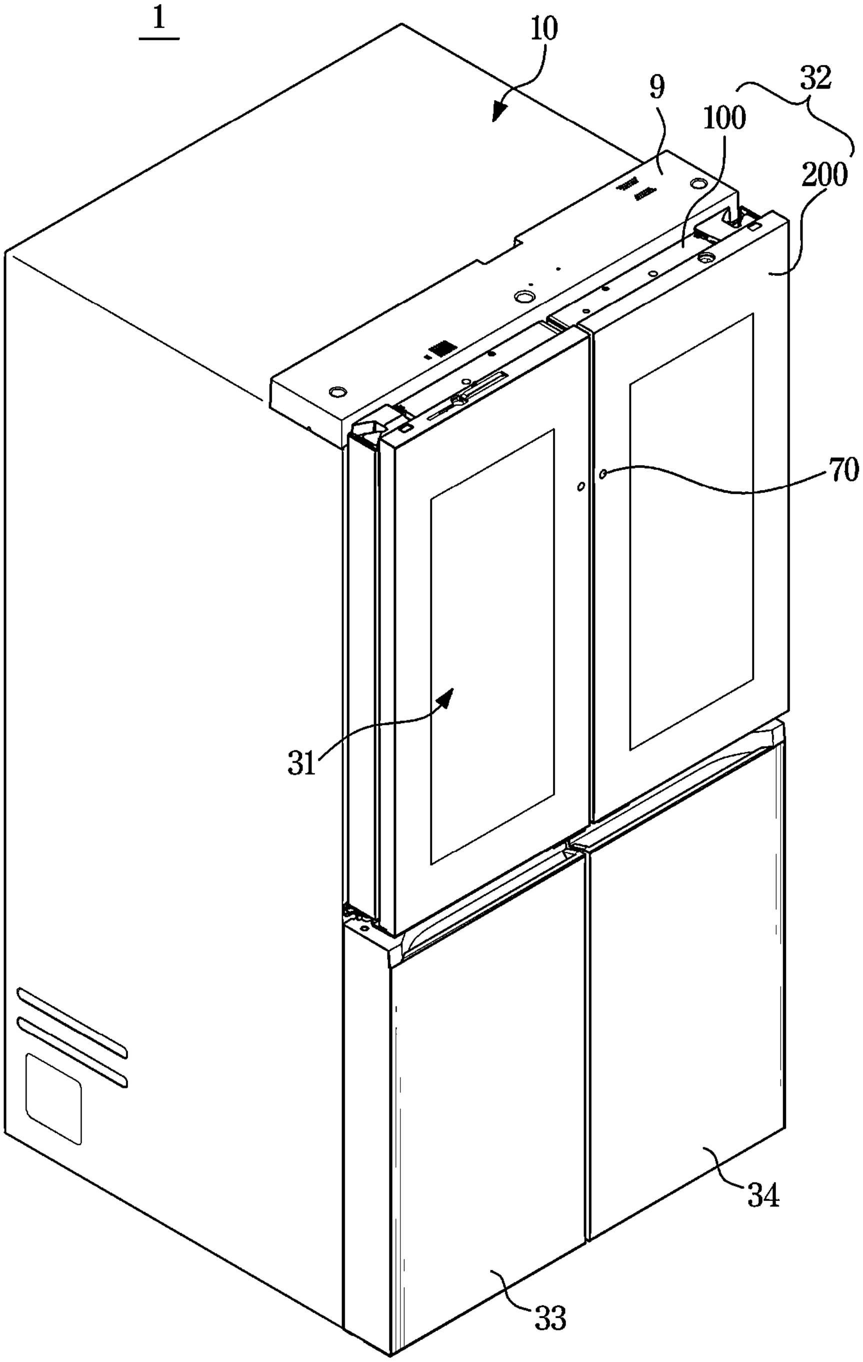
FIG. 1 illustrates a state in which all doors are closed in a refrigerator according to an embodiment of the present disclosure.

Various embodiments and terms in this document are not intended to limit the technical features described in this document to specific embodiments, and should be understood to include various modifications, equivalents, or substitutes of the embodiments.

In connection with the description of the drawings, like reference numbers may be used for like or related components.

The singular form of a noun corresponding to an item may include one item or a plurality of items, unless the relevant context clearly dictates otherwise.

In this document, each of phrases such as "A or B," "at least one of A and B," "at least one of A or B," "A, B or C," "at least one of A, B and C," and "at least one of A, B, or C" may include any one of the items listed together in the corresponding one of the phrases, or all possible combinations thereof.

The term "and/or" includes any combination of a plurality of related components or any one of a plurality of related components.

Terms such as "first," "second," "primary," and "secondary" may simply be used to distinguish a given component from other corresponding components, and do not limit the corresponding components in any other aspect (e.g., importance or order).

In this specification, the terms "front surface," "rear surface," "upper surface," "lower surface," "side surface," "left side," "right side," "upper portion," and "lower portion" used in the following description are defined with reference to the drawings, and the shape and position of each component are not limited by these terms.

The terms "comprises" and "has" are intended to indicate that there are features, numbers, steps, operations, components, parts, or combinations thereof described in this document, and do not exclude the presence or addition of one or more other features, numbers, steps, operations, components, parts, or combinations thereof.

When any component is referred to as being "connected", "coupled", "supported" or "in contact" with another component, this includes a case in which the components are indirectly connected, coupled, supported, or in contact with each other through a third component as well as directly connected, coupled, supported, or in contact with each other.

When any component is referred to as being located "on" or "above" another component, this includes not only a case in which any component is in contact with another component but also a case in which another component is present between the two components.

A refrigerator according to an embodiment may include a main body.

The main body may include a heat insulator. The heat insulator may insulate the inside and outside of a storage compartment so that a temperature inside the storage compartment may be kept at a set appropriate temperature without being affected by an external environment of the storage compartment. According to one embodiment, the heat insulator may include a foam heat insulator such as polyurethane foam. According to one embodiment, the heat insulator may further include a vacuum heat insulator in addition to the foam heat insulator, or may be configured as only the vacuum heat insulator instead of the foam heat insulator.

The storage compartment may store various items such as food, medicine, and cosmetics, and may be formed such that at least one side thereof is open to allow items to be put in and to be taken out.

The refrigerator may include one or more storage compartments. When two or more storage compartments are formed in the refrigerator, the respective storage compartments may have different uses and may be kept at different temperatures. To this end, the respective storage compartments may be partitioned from each other by partitions including the heat insulators.

The storage compartment may be provided to be kept at an appropriate temperature range depending on the use, and may include a "refrigerating chamber," a "freezing chamber," or a "variable temperature chamber" depending on the use and/or temperature range. The refrigerating chamber may be kept at an appropriate temperature for storing items in a refrigerated state, and the freezing chamber may be kept at an appropriate temperature for storing items in a frozen state. "Refrigerating" may refer to cooling items to the point where the items are not frozen, and as an example, the refrigerating chamber may be kept in a temperature ranging from zero degree Celsius to seven degrees Celsius. "Freezing" may refer to cooling items such that the items are freezing or kept in a frozen state. As an example, the freezing chamber may be kept at a temperature ranging from minus twenty degrees Celsius to minus one degree Celsius. The variable temperature chamber may be used as any one of the refrigerating chamber and the freezing chamber, depending on a selection of a user or regardless of the selection of the user.

In addition to names such as "refrigerating chamber," "freezing chamber," and "variable temperature chamber," the storage compartment may be referred to as various names such as "vegetable chamber," "fresh chamber," "cooling chamber," and "ice making chamber," terms such as "refrigerating chamber," "freezing chamber," and "variable temperature chamber" used below should be understood to encompass storage compartments with corresponding uses and temperature ranges, respectively.

According to one embodiment, the refrigerator may include at least one door configured to open and close the one open side of the storage compartment. The doors may each be provided to open and close the one or more storage compartments, or the one door may be provided to open and close a plurality of the storage compartments. The door may be rotatably or slidingly installed on a front side of the main body.

The door may be configured to seal the storage compartment when closed. Like the main body, the door may include the heat insulator to insulate the storage compartment when closed.

According to one embodiment, the door may include a door outer plate forming a front surface of the door, a door inner plate forming a rear surface of the door and facing the storage compartment, an upper cap, a lower cap, and a door heat insulator provided inside the upper and lower caps.

Edges of the door inner plate may be provided with a gasket sealing the storage compartment by coming into close contact with the front side of the main body when the door is closed. The door inner plate may include a dyke protruding rearward so that a door basket for storing items is mounted.

According to one embodiment, the door may include a door body, and a front panel detachably coupled to a front side of the door body and forming the front surface of the door. The door body may include the door outer plate forming a front surface of the door body, the door inner plate forming a rear surface of the door body and facing the storage compartment, the upper cap, the lower cap, and the door heat insulator provided inside the upper and lower caps.

Refrigerators may be classified into a French door type, a side-by-side type, a bottom mounted freezer (BMF) type, a top mounted freezer (TMF) type, and a one-door refrigerator type depending on the arrangement of doors and storage compartments.

According to one embodiment, the refrigerator may include a cold air supply system configured to supply cold air to the storage compartment.

The cold air supply device may include a machine, mechanism, electronic device, and/or a system combining them capable of generating cold air and guiding the cold air to cool the storage compartment.

According to one embodiment, the cold air supply system may generate cold air through a refrigeration cycle including compression, condensation, expansion, and evaporation processes of a refrigerant. To this end, the cold air supply system may include a refrigeration cycle device having a compressor, a condenser, an expansion device, and an evaporator capable of driving the refrigeration cycle. According to one embodiment, the cold air supply system may include a semiconductor such as a thermoelectric element. The thermoelectric element may cool the storage compartment by generating heat and cooling through the Peltier effect.

According to one embodiment, the refrigerator may include a machine room in which at least some components belonging to the cold air supply system are disposed.

The machine room may be provided to be partitioned and insulated from the storage compartment in order to prevent heat generated from the components disposed in the machine room from being transferred to the storage compartment. The inside of the machine room may be configured to communicate with the outside of the main body to dissipate heat from the components disposed inside the machine room.

According to one embodiment, the refrigerator may include a dispenser provided on the door to provide water and/or ice. The dispenser may be provided on the door such that the user may access the door without opening the door.

According to one embodiment, the refrigerator may include an ice making device provided to produce ice. The ice making device may include an ice making tray provided to store water, an ice moving device provided to separate the ice from the ice making tray, and an ice bucket provided to store the ice produced in the ice making tray.

According to one embodiment, the refrigerator may include a controller configured to control the refrigerator.

The controller may include a memory provided to store or remember programs and/or data for controlling the refrigerator, and a processor provided to output a control signal for controlling a cold air supply system and the like according to the program and/or data stored in the memory.

The memory stores or records various information, data, commands, programs, and the like required for operations of the refrigerator. The memory may remember temporary data generated while generating control signals for controlling components included in the refrigerator. The memory may include at least one of volatile memory and non-volatile memory, or a combination thereof.

The processor controls the overall operation of the refrigerator. The processor can control the components of the refrigerator by executing the programs stored in the memory. The processor may include a separate NPU to perform operations of an artificial intelligence model. The processor may also include a central processor, a graphics processor (GPU), and the like. The processor may generate a control signal for controlling an operation of the cold air supply system. For example, the processor may receive temperature information of the storage compartment from a temperature sensor, and generate a cooling control signal for controlling the operation of the cold air supply system based on the temperature information of the storage compartment.

Additionally, the processor may process user input of a user interface according to the programs and/or data memorized/stored in the memory and control an operation of the user interface. The user interface may be provided using an input interface and an output interface. The processor may receive the user input from the user interface. The processor may also transmit a display control signal and image data for displaying an image on the user interface to the user interface in response to the user input.

The processor and the memory may be provided integrally or may be provided separately. The processor may include one or more processors. For example, the processor may include a main processor and at least one sub-processor. The memory may include one or more memories.

According to one embodiment, the refrigerator may include a processor and a memory to control all the components included in the refrigerator, and may include a plurality of processors and a plurality of memories to individually control the components of the refrigerator. For example, the refrigerator may include a processor and memory to control the operation of the cold air supply system depending on output of the temperature sensor. Also, the refrigerator may be separately equipped with a processor and memory to control the operation of the user interface according to user input.

A communication module may communicate with an external device such as a server, a mobile device, and another home appliance through a nearby access point (AP). The access point (AP) may connect a local area network (LAN) to which the refrigerator or a user device is connected to a wide area network (WAN) to which the server is connected. The refrigerator or the user device may be connected to the server via the wide area network (WAN).

The input interface may include a key, a touch screen, a microphone, and the like. The input interface may receive user input and transmit the user input to the processor.

The output interface may include a display, a speaker, and the like. The output interface may output various notifications, messages, information, and the like generated by the processor.

Hereinafter, preferable embodiments of the present disclosure will be described in detail with reference to the accompanying drawings.

Figure 2:
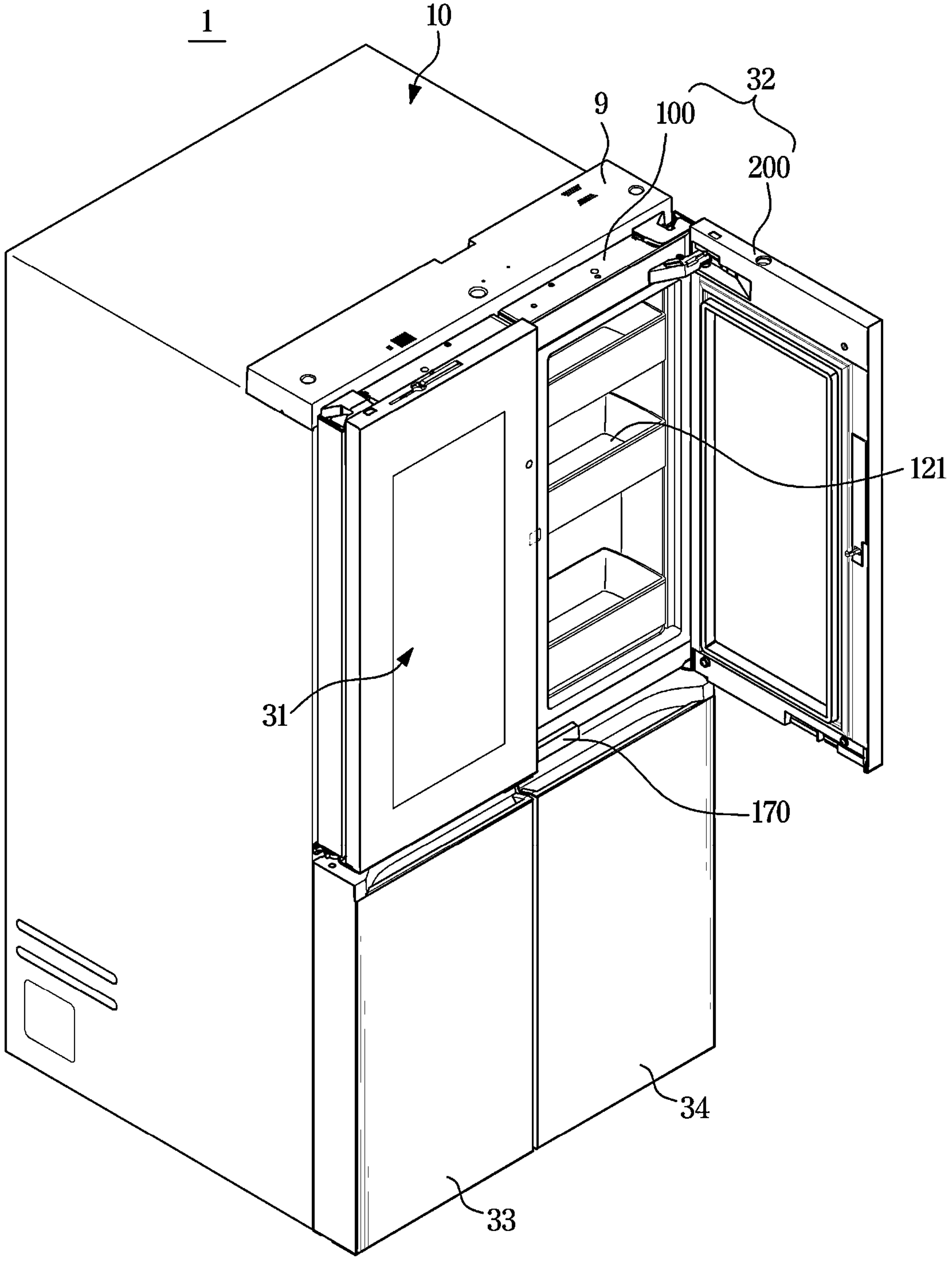
FIG. 2 illustrates a state in which one outer door is opened in the refrigerator according to an embodiment of the present disclosure.
Figure 3:
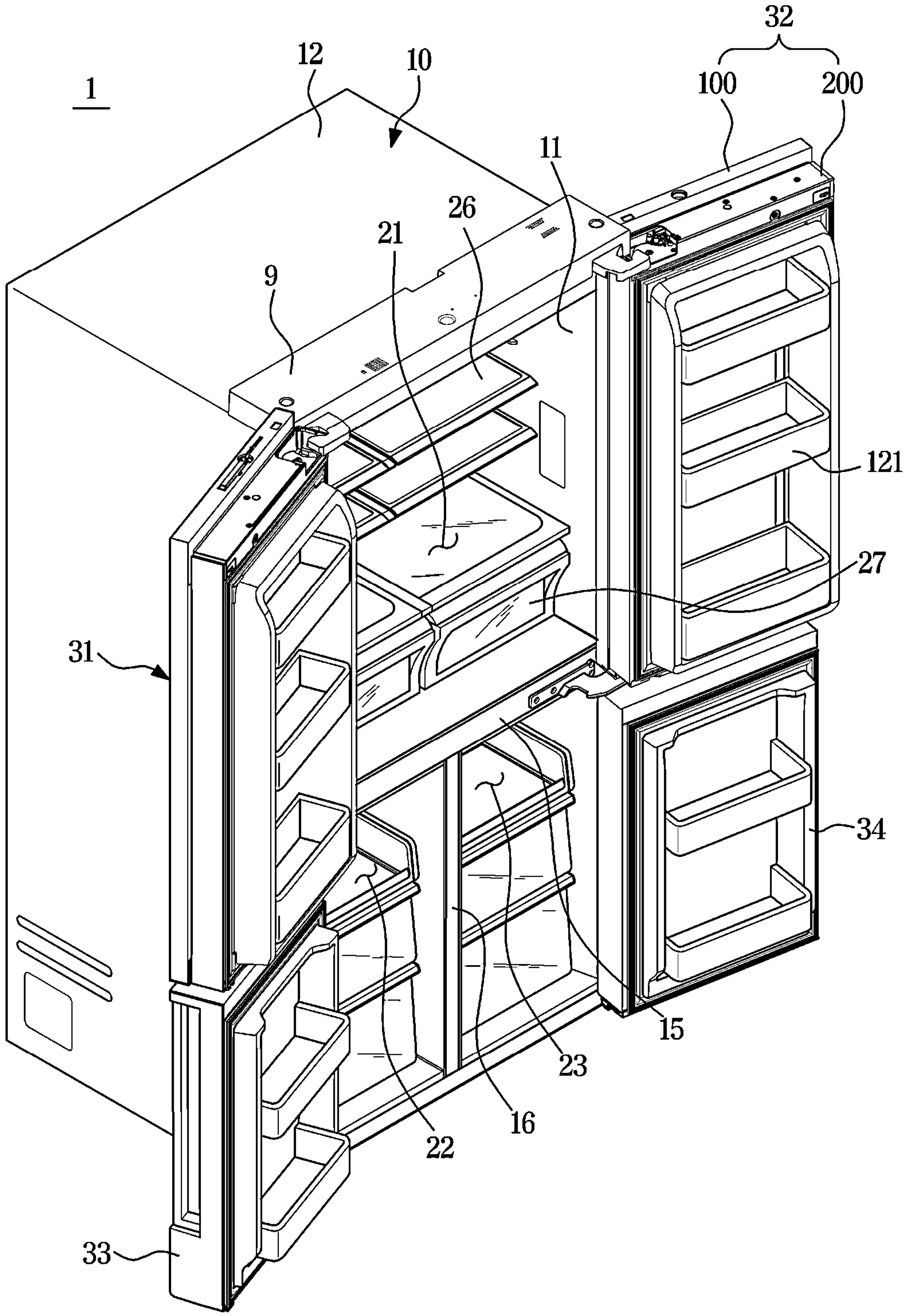
FIG. 3 illustrates a state in which all the doors are opened in the refrigerator according to an embodiment of the present disclosure.
Figure 4:
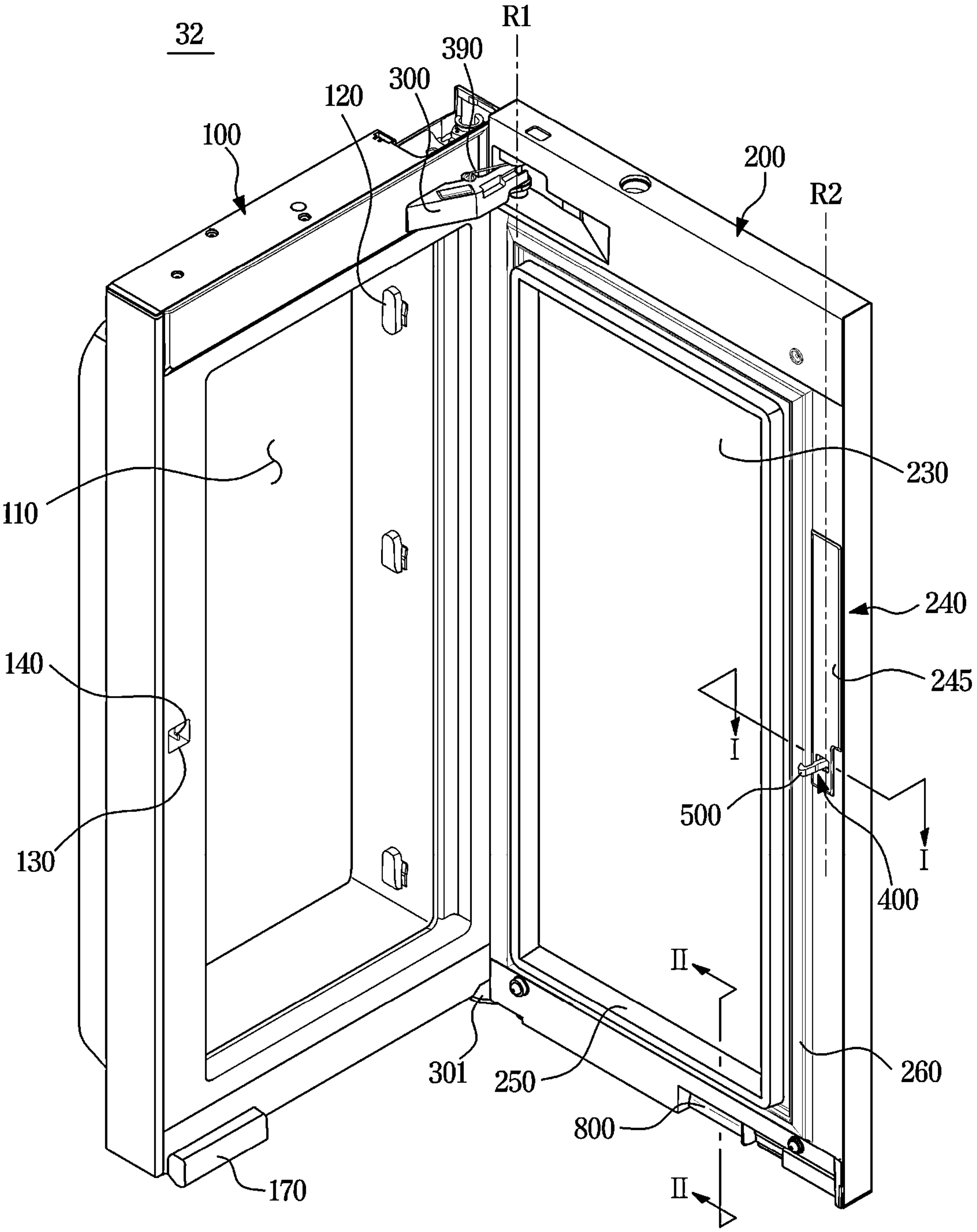
FIG. 4 illustrates an inner door and an outer door according to an embodiment of the present disclosure.

FIG. 1 illustrates a state in which all doors are closed in a refrigerator according to an embodiment of the present disclosure. FIG. 2 illustrates a state in which one outer door is opened in the refrigerator according to an embodiment of the present disclosure. FIG. 3 illustrates a state in which all the doors are opened in the refrigerator according to an embodiment of the present disclosure. FIG. 4 illustrates an inner door and an outer door according to an embodiment of the present disclosure.

Referring to FIGS. 1 to 4, a refrigerator 1 may include a main body 10, storage compartments 21, 22, and 23 formed inside the main body 10, doors 31, 32, 33, and 34 provided to open and close the storage compartments 21, 22, and 23, and a cold air supply device (not shown) for supplying cold air to the storage compartments 21, 22, and 23.

The main body 10 may include an inner case 11 forming the storage compartments 21, 22, and 23, an outer case 12 coupled to the outside of the inner case 11 to form an exterior, and a heat insulator (not shown) provided between the inner case 11 and the outer case 12 to insulate the storage compartments 21, 22, and 23. A top cover 9 capable of covering an upper hinge of the inner door 100 may be provided on an upper surface of the main body 10.

A plurality of the storage compartments 21, 22, and 23 may be partitioned by a horizontal partition 15 and a vertical partition 16. The storage compartments 21, 22, and 23 may be partitioned into the upper storage compartment 21 and the lower storage compartments 22 and 23 by the horizontal partition 15, and the lower storage compartments 22 and 23 may be partitioned into the left lower storage compartment 22 and the right lower storage compartment 23 by the vertical partition 16.

The upper storage compartment 21 may be used as a refrigerating compartment, and the lower storage compartments 22 and 23 may be used as freezing compartments. However, the division and use of the storage compartments 21, 22, and 23 as described above is only an example and is not limited thereto.

Unlike this embodiment, the refrigerator may be a side by side (SBS) type refrigerator in which the storage compartment is partitioned into left and right sides by a vertical partition, a French door refrigerator (FDR) in which the storage compartment is partitioned into an upper refrigerating compartment and a lower refrigerating compartment by a horizontal partition, or a one-door type refrigerator with one storage compartment and one door.

Shelves 26 and storage containers 27 may be provided inside the storage compartments 21, 22, and 23.

The cold air supply device may generate cold air using a refrigeration cycle in which the refrigerant is compressed, condensed, expanded, and evaporated, and may supply the generated cold air to storage compartments 21, 22, and 23.

The upper storage compartment 21 may be opened and closed by a pair of the doors 31 and 32. The doors 31 and 32 may be rotatably coupled to the main body 10. The one door 31 of the pair of doors 31 and 32 may be provided with a rotating bar (not shown) to prevent cold air in the storage compartment 21 from leaking between the pair of doors 31 and 32 when the pair of doors 31 and 32 are closed.

The lower left storage compartment 22 may be opened and closed by the door 33, and the door 33 may be rotatably coupled to the main body 10. The lower right storage compartment 23 may be opened and closed by the door 34, and the door 34 may be rotatably coupled to the main body 10.

At least one of the doors 31, 32, 33, and 34 may be configured as a double door having an inner door and an outer door. As an example, the upper right door 32 may include an inner door 100 and an outer door 200.

The inner door 100 may be rotatably coupled to the main body 10 through a hinge. The inner door 100 may have an opening 110. The opening 110 may be formed to penetrate a central portion of the inner door 100 in a front-rear direction. Therefore, the opening 110 may communicate with the storage compartment 21. A door basket 121 accommodating items may be installed in the opening 110. To this end, a basket support 120 may protrude from a surface of the inner door 100 facing the opening 110 so that the door basket 121 is mounted thereon. A handle 170 may be provided on the inner door 100 so that the user may hold the handle and open the inner door 100.

The outer door 200 may be provided to open and close the opening 110 of the inner door 100. When the outer door 200 is opened, the opening 110 of the inner door 100 and the door basket 121 provided in the opening 110 may be accessed. That is, the door basket 121 may be accessed by opening the outer door 200 without the need to open the inner door 100.

The outer door 200 may be rotatably coupled to the inner door 100 through an upper hinge 300 and a lower hinge 301.

An outer door rotation axis R1 is parallel to an inner door rotation axis, and the outer door 200 may rotate in the same direction as the inner door 100. The outer door 200 may have a size corresponding to a size of the inner door 100. The outer door 200 may cover an entire region of the inner door 100.

The refrigerator 1 may include a locking device 400 capable of locking or unlocking the outer door 200. When the outer door 200 is in a locked state by the locking device 400, the opening of the outer door 200 is impossible, and when the outer door 20 is released from the locked state by the locking device 400, the opening of the outer door 200 is possible.

The locking device 400 may be provided on the outer door 200. The locking device 400 may include a latch 500 provided to be rotatable about a latch rotation axis R2. The latch rotation axis R2 may be formed to be parallel to the outer door rotation axis R1.

The inner door 100 may be provided with a fixer 140 to or from which the latch 500 is coupled or separated. The fixer 140 may be provided on a front surface of the inner door 100. A recessed slot 130 may be formed on the front surface of the inner door 100, and the fixer 140 may be formed inside the slot 130.

The latch 500 may have a hook shape coupled to the fixer 140. The latch 500 may be provided to be rotatable about the latch rotation axis R2 (FIGS. 4 and 6) between a locked position in which the latch is coupled to the fixer 140 and an unlocked position in which the latch is separated from fixer 140.

When the latch 500 is in the locked position, that is, when the latch 500 is coupled to the fixer 140, the outer door 200 becomes in the locked state, and becomes in a state in which the outer door 200 may not be opened.

When the latch 500 is in the unlocked position, that is, when the latch 500 is separated from the fixer 140, the outer door 200 becomes in an unlocked state, and the outer door 200 may be openable.

According to an embodiment of the present disclosure, when the outer door 200 is in the unlocked state, the outer door 200 may be automatically opened without any additional operation. To this end, the refrigerator 1 may include a door elastic member 390 (FIG. 4) provided to elastically bias the outer door 200 in an opening direction.

The door elastic member 390 may be provided between the hinge 300 and the outer door 200. The door elastic member 390 may accumulate an elastic force when the outer door 200 is closed. When the outer door 200 is unlocked, the outer door 200 may be opened by the elastic force accumulated in the door elastic member 390.

According to an embodiment of the present disclosure, the locking device 400 may be operated manually and automatically. That is, the latch 500 may be rotated through the physical force of the user (i.e., manipulation force), or the latch 500 may be rotated through a driving force generated from a separate driving source. To this end, the locking device 400 may include a manual unlocking unit and an automatic unlocking unit. However, depending on one embodiment, one of the manual unlocking unit and the automatic unlocking unit may be omitted.

Figure 9:
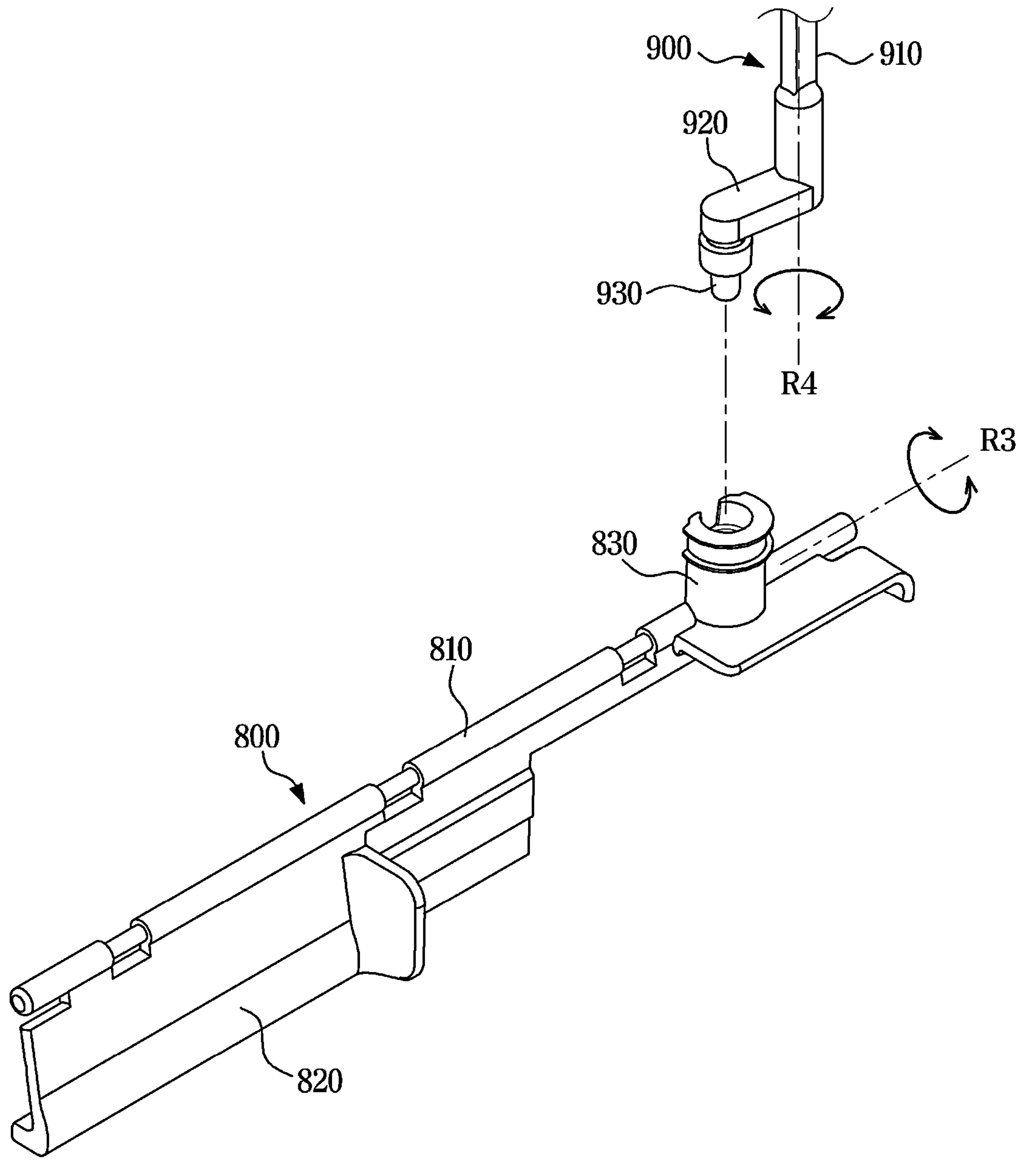
FIG. 9 illustrates a coupling structure of a lever and a connecting rod according to an embodiment of the present disclosure.

The manual unlocking unit may include a lever 800 provided to be manually operated by contact of the user. The lever 800 may be provided to be rotatable about a lever rotation axis R3 (FIG. 9). The latch 500 may be rotated by transmitting a manipulation force of the user applied to the lever 800 to the latch 500. Instead of the user rotating the lever 800 about the lever rotation axis R3, the user may open the outer door 200 by pulling the lever 800 in the horizontal direction. In this aspect, the lever 800 may also be referred to as a handle of the outer door 200. The lever 800 may be provided at a lower portion of the outer door 200.

The refrigerator 1 may include an input unit 50 (FIG. 5) provided to receive an unlock signal from the user to unlock the outer door 200. According to one embodiment, the input unit 50 may include a touch board 60 (FIG. 5) including a touch sensor that detects a touch of the user. A touch region 70 (FIG. 1) may be provided on a front surface of the outer door 200, and the touch board 60 may be provided inside the outer door 200 to correspond to the touch region 70. That is, the touch region 70 may be provided on a front surface of a front panel 220 (FIG. 5), which will be described later, and the touch board 60 may be provided on a rear surface of the front panel 220 at a position corresponding to the touch region 70.

The touch region 70 may be provided with an identifiable symbol or design. The touch region 70 may be formed of a printed layer provided on the front surface of the front panel 220. The touch board 60 may be configured to detect static electricity generated when the user touches the touch region 70. However, the input unit 50 is not limited to this touch board and may be formed of physical buttons, various switches, etc.

Reference numerals 230, 240, 245, 250, and 260 in FIG. 4, which are not explained, indicate an insulation panel 230, a door chassis 240, a chassis cover 245, a door liner 250, and a gasket 260, respectively.

Figure 5:
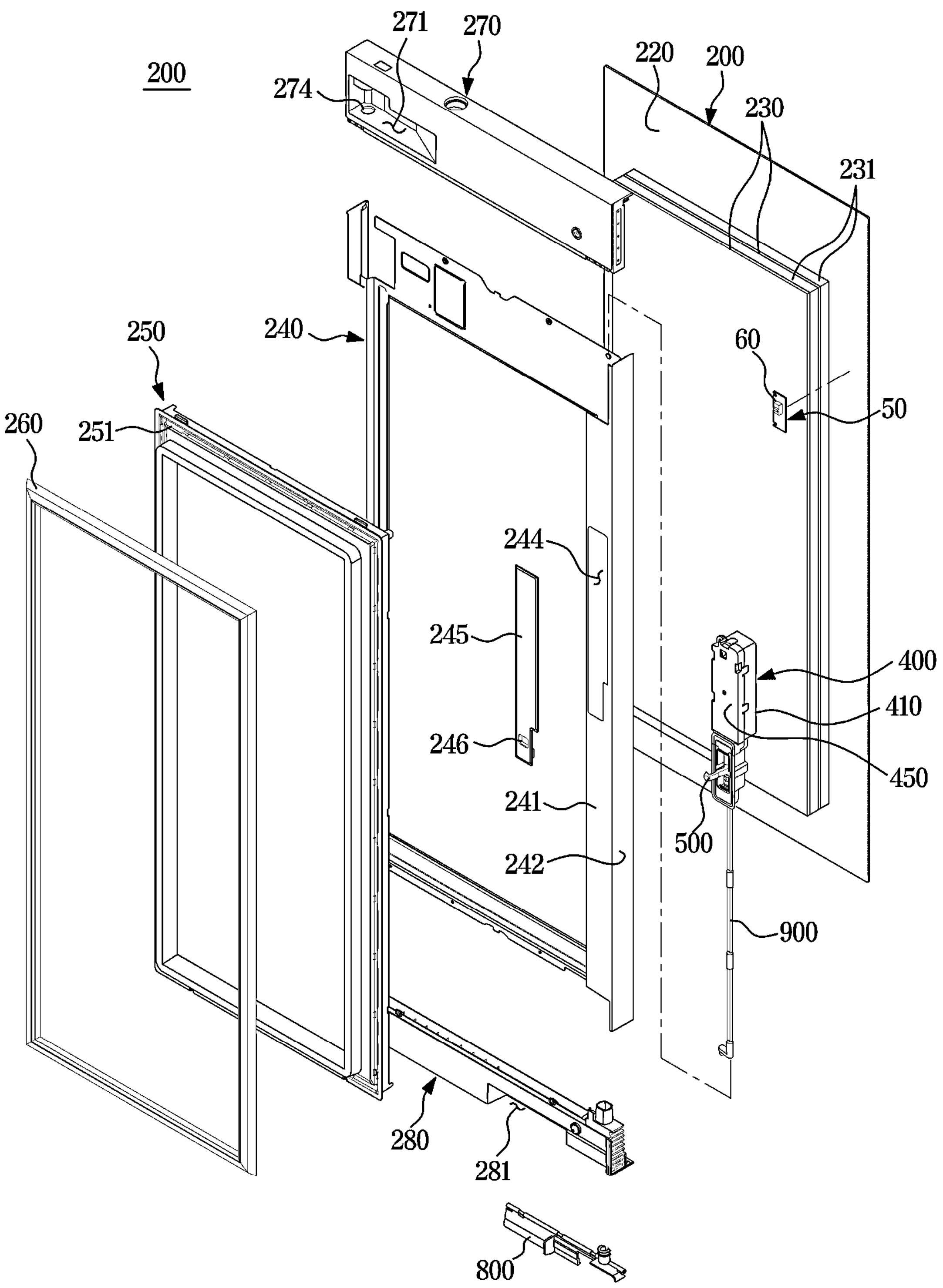
FIG. 5 is an exploded view of the outer door according to an embodiment of the present disclosure.
Figure 6:
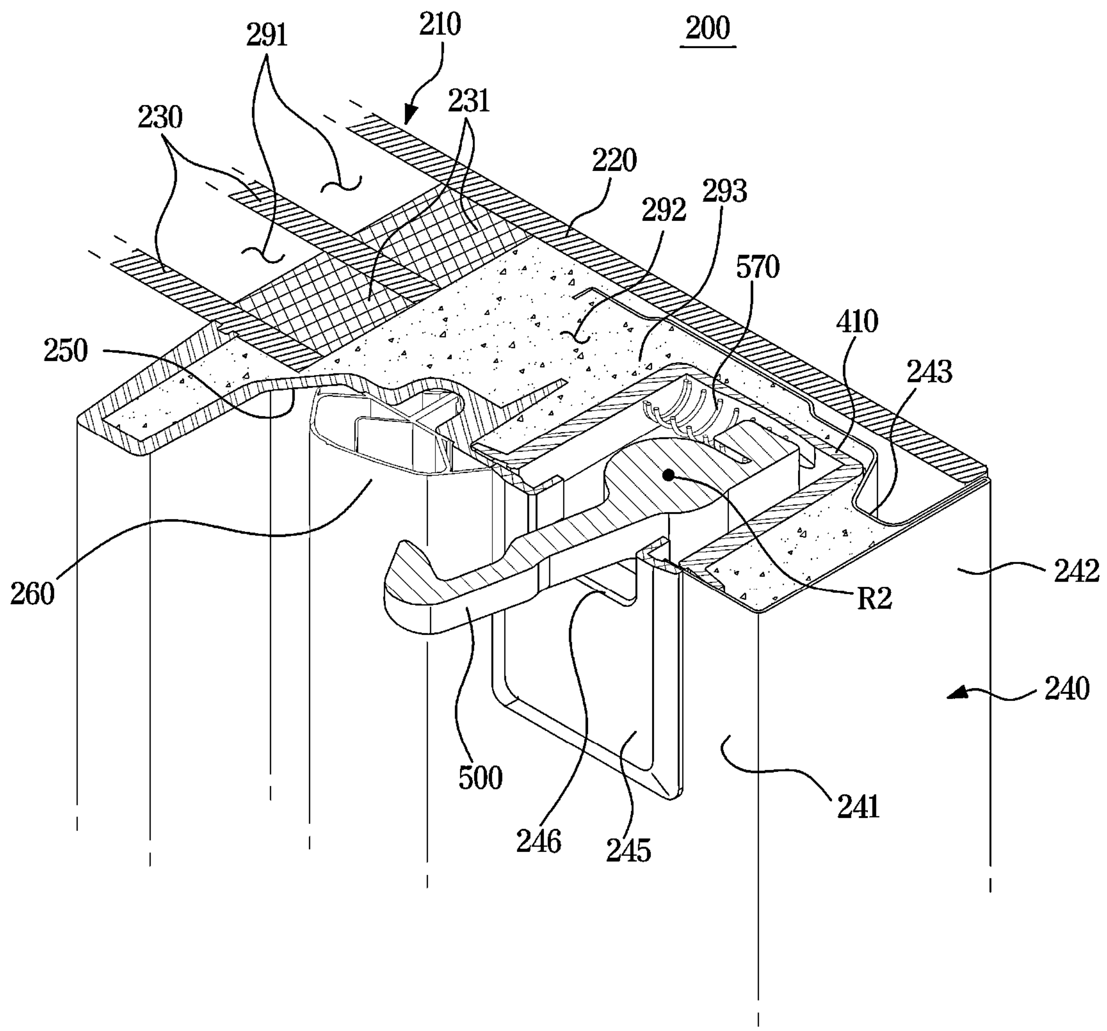
FIG. 6 is a cross-sectional view of the outer door taken along line I-I in FIG. 4 according to an embodiment of the present disclosure.
Figure 7:
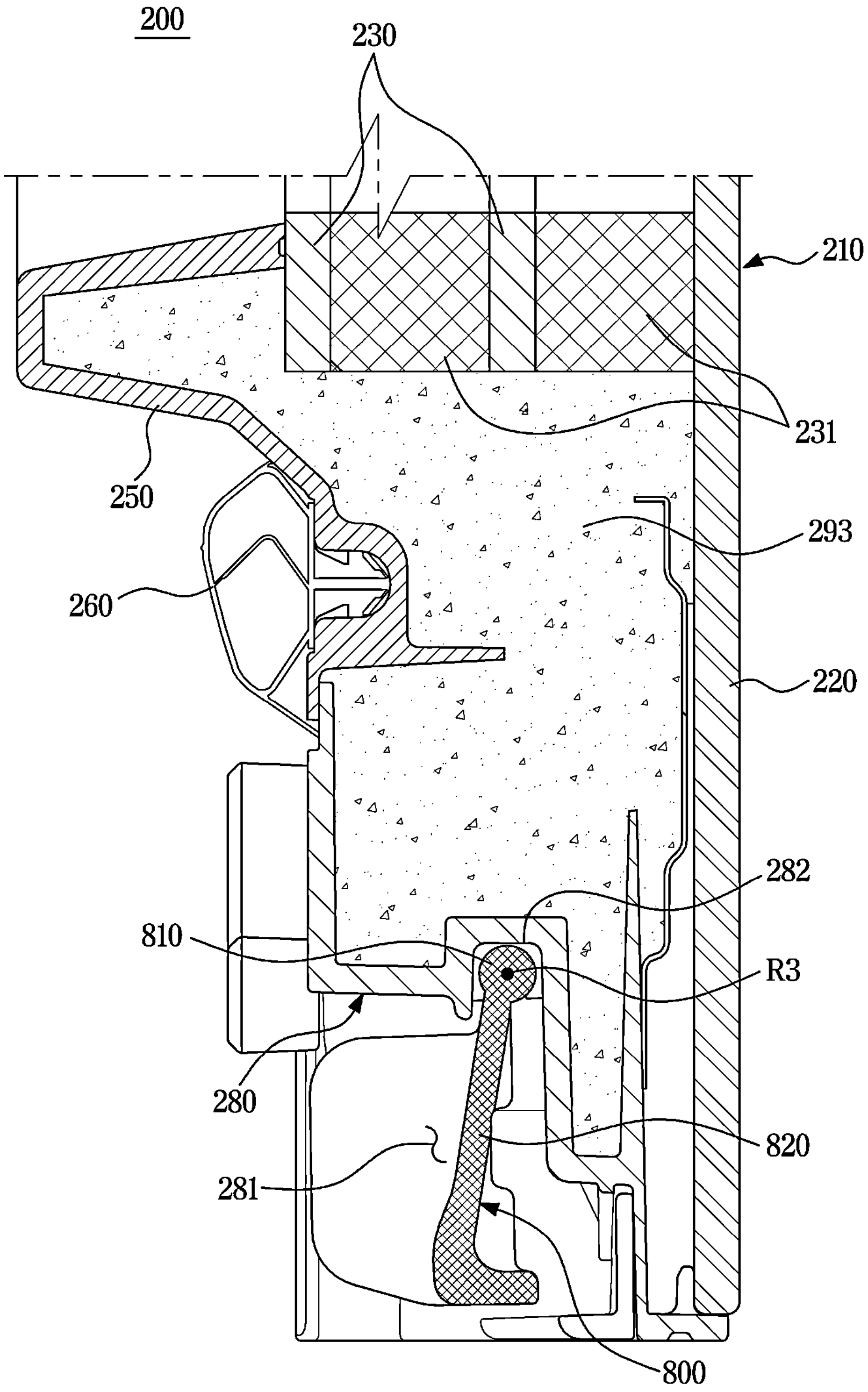
FIG. 7 is a cross-sectional view of the outer door taken along line II-II in FIG. 4 according to an embodiment of the present disclosure.

FIG. 5 is an exploded view of the outer door according to an embodiment of the present disclosure. FIG. 6 is a cross-sectional view of the outer door taken along line I-I in FIG. 4 according to an embodiment of the present disclosure. FIG. 7 is a cross-sectional view of the outer door taken along line II-II in FIG. 4 according to an embodiment of the present disclosure.

The configurations of the outer door 200 and the locking device 400 will be described with reference to FIGS. 5 to 7. The outer door 200 may include a front panel assembly 210 forming the front surface of the outer door 200, the door chassis 240 forming opposite side surfaces of the outer door 200, the door liner 250 forming an edge of a rear surface of the outer door 200, an upper cap 270, and a lower cap 280.

The front panel assembly 210 may include the front panel 220, and the at least one insulation panel 230 provided to be spaced apart from the front panel 220. According to one embodiment, the front panel 220 and the insulation panel 230 may be made of a transparent material, for example, glass. Therefore, even when the outer door 200 is closed, the opening 110 of the inner door 100 and the door basket 121 provided in the opening 110 may be seen through the front panel 220 and the insulation panel 230.

Depending on one embodiment, the front panel 220 and the insulation panel 230 may be formed of a translucent or opaque material. Depending on one embodiment, the front panel 220 and the insulation panel 230 may be formed to be switchable between a transparent state and an opaque state. Depending on one embodiment, the front panel 220 may include a display.

An intermediate member 231 may be provided in a spaced gap between the front panel 220 and the insulation panel 230. The intermediate member 231 may cover the spaced gap between the front panel 220 and the insulation panel 230. When a plurality of the insulation panels 230 is provided, the intermediate members 231 may be provided between the insulation panels 230.

The intermediate member 231 may have a rectangular frame shape. The intermediate members 231 may support the front panel 220 and the insulation panels 230. The intermediate members 231 may be provided to form first insulation spaces 291 between the front panel 220 and the insulation panel 230 and between the plurality of insulation panels 230. That is, the first insulation spaces 291 may be formed by the front panel 220, the insulation panels 230, and the intermediate members 231. The first insulation spaces 291 may be formed by the plurality of insulation panels 230 and the intermediate members 231. The first insulation space 291 may be formed in a vacuum, or an air insulation layer may be formed in the first insulation space 291.

The door chassis 240 may form the opposite side surfaces of the outer door 200. The door chassis 240 may be made of a metal material. The door chassis 240 may have a square frame shape. As illustrated in FIGS. 5 and 6, the door chassis 240 may include a chassis rear portion 241, chassis side portions 242 bent at the chassis rear portion 241, and a chassis front portion 243 bent at the chassis side portions 242.

The chassis rear portion 241 may form the edge of the rear surface of the outer door 200. The door liner 250 may be coupled to the chassis rear portion 241. The chassis side portions 242 may form the side surfaces of the outer door 200. The chassis front portion 243 may be coupled to the front panel 220.

A second insulation space 292 may be formed by the front panel assembly 210, the door chassis 240, the door liner 250, the upper cap 270, and the lower cap 280. A heat insulator 293 may be provided in the second insulation space 292. The heat insulator 293 may include urethane foam.

Figure 11:
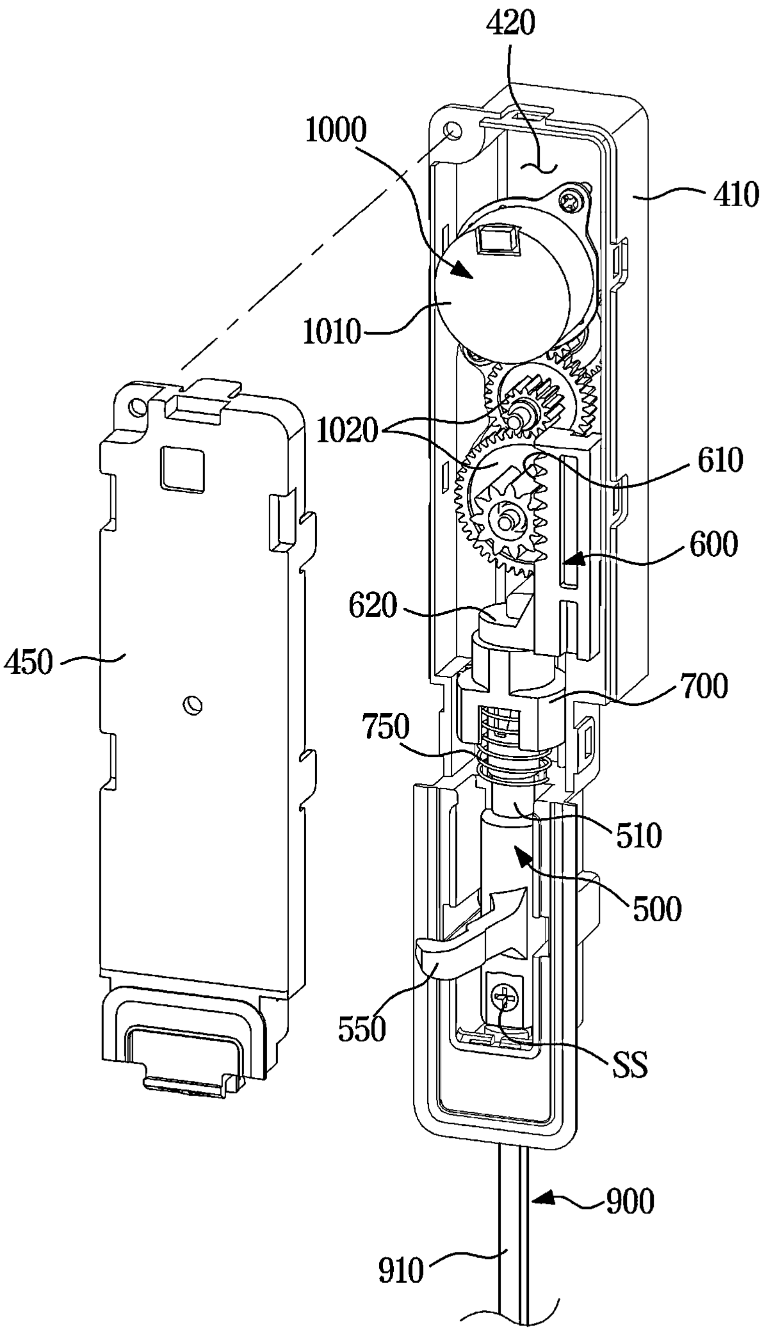
FIG. 11 illustrates a housing cover separated from a housing of the locking device according to an embodiment of the present disclosure.

The locking device 400 may include a housing 410 in which an accommodation space 420 is formed, and a housing cover 450 detachably coupled to the housing 410 to cover the accommodation space 420 (FIG. 11). The housing 410 may partition the accommodation space 420 and the insulation space 292 to prevent the heat insulator from penetrating into the accommodation space 420.

A motor 1010, at least one rotation gear 1020, a pusher 600, a connector 700, the latch 500, etc. may be accommodated in the accommodation space 420. The accommodation space 420 may be formed such that one side thereof is open, and the housing cover 450 may cover the one open side of the accommodation space 420.

The housing 410 may be disposed inside the outer door 200. The housing 410 may be disposed in a space formed between the chassis rear portion 241 and the chassis front portion 243. The housing 410 may be embedded in and fixed to the heat insulator 293. The housing cover 450 may be disposed inside the outer door 200.

The chassis rear portion 241 may include a chassis opening 244. The chassis opening 244 may be formed at a position corresponding to the housing 410 of the locking device 400. The inside of the housing 410 may be accessible through the chassis opening 244.

The outer door 200 may include the chassis cover 245 detachably coupled to the chassis opening 244 to cover the chassis opening 244. The chassis cover 245 may include a chassis cover opening 246 to penetrate the latch 500 of the locking device 400.

A connecting rod 900 connecting the latch 500 and the lever 800 may be disposed inside the outer door 200. The connecting rod 900 may be rotatably accommodated inside a rod cover (not shown) so that the connecting rod 900 is rotatable. The insulation space 292 and an inner space of the rod cover may be partitioned by the rod cover (not shown).

The door liner 250 may be coupled to a rear surface of the door chassis 240. The door liner 250 may form a portion of the rear surface of the outer door 200. A gasket mounting portion 251 on which the gasket 260 is mounted may be formed to be recessed on a rear surface of the door liner 250.

The gasket 260 may be mounted on the gasket mounting portion 251 of the door liner 250. The gasket 260 may be made of an elastic material such as rubber. When the outer door 200 is closed, the gasket 260 may be in close contact with the front surface of the inner door 100. When the outer door 200 is closed, the gasket 260 may be in close contact with a periphery of the opening 110 on the front surface of the inner door 100 to seal the opening 110.

The upper cap 270 may be coupled to upper ends of the front panel 220 and the door liner 250. The upper cap 270 may include a hinge accommodating portion 271 formed to be recessed in one surface of the upper cap 270 to accommodate the hinge 300. The hinge 300 may include a hinge pin forming the outer door rotation axis R1, and a hinge pin insertion hole 274 into which the hinge pin is inserted may be formed in the hinge accommodating portion 271.

The lower cap 280 may be coupled to lower ends of the front panel 220 and the door liner 250. The lever 800 capable of being manually manipulated by the user to release the locking device 400 may be mounted in the lower cap 280 to be rotatable about the lever rotation axis R3. A lever accommodating portion 281 in which the lever 800 is accommodated may be formed at a lower portion of the lower cap 280.

The lever 800 may include a lever shaft 810 forming the lever rotation axis R3 and a lever handle 820 protruding from the lever shaft 810 so that the lever handle may be manipulated by the user. A shaft support 282 may be provided on the lever accommodating portion 281 of the lower cap 280 to rotatably support the lever shaft 810.

Figure 8:
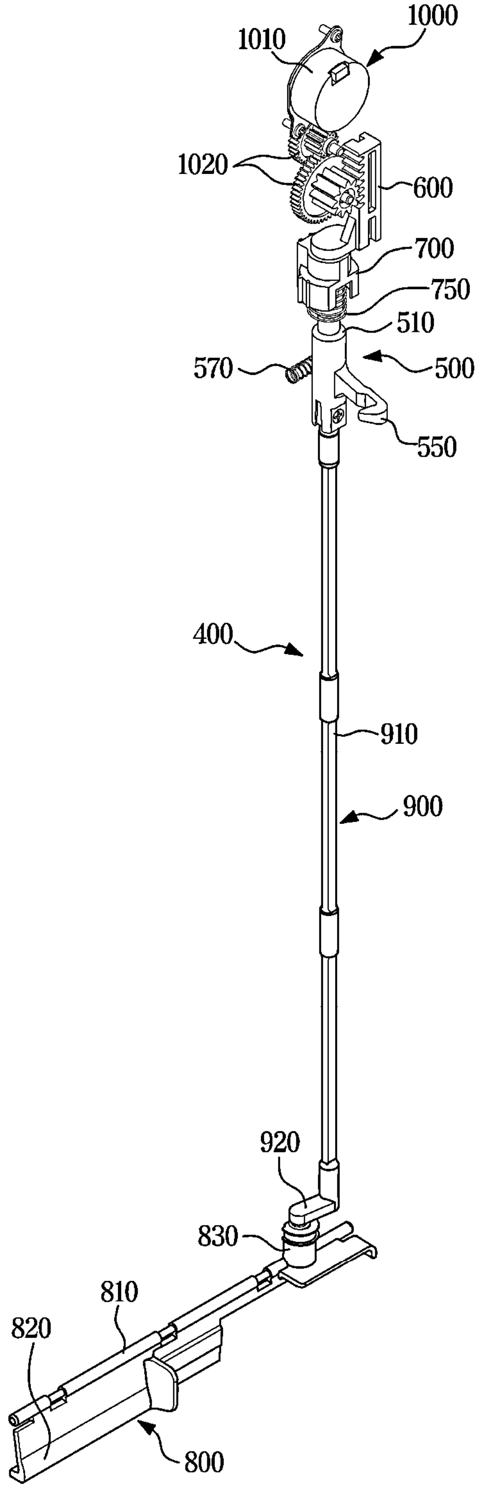
FIG. 8 illustrates a locking device according to an embodiment of the present disclosure.
Figure 10:
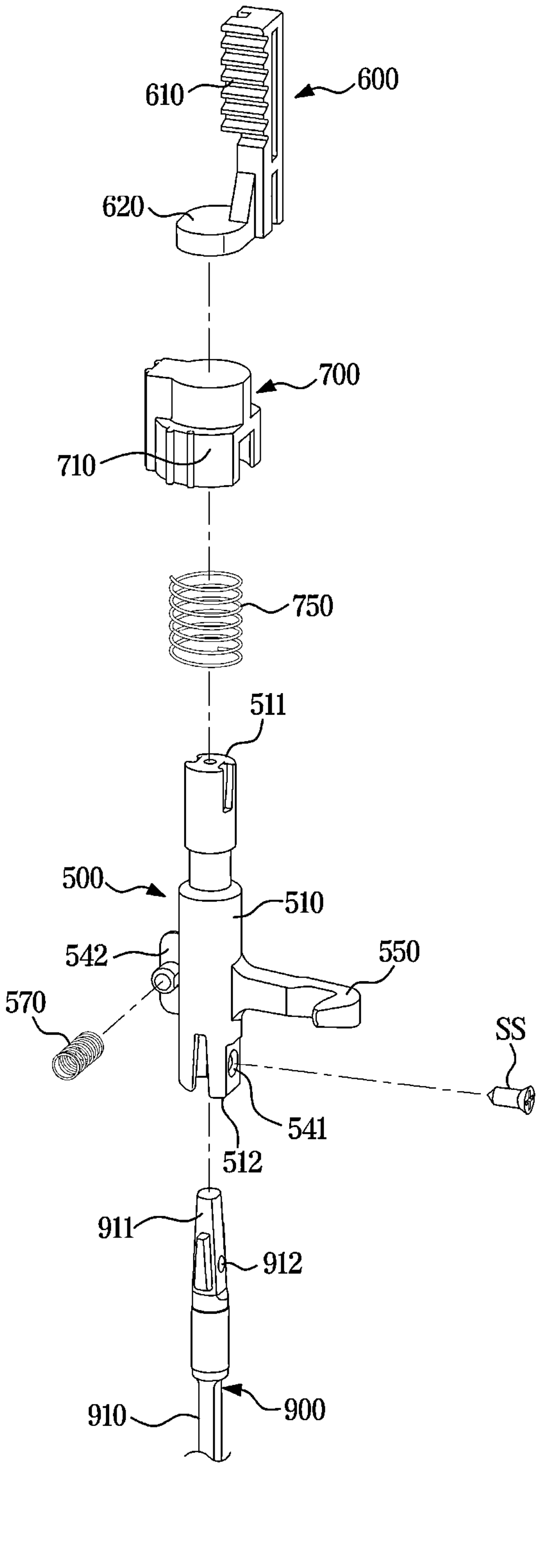
FIG. 10 is an exploded view illustrating one part of the locking device according to an embodiment of the present disclosure.
Figure 12:
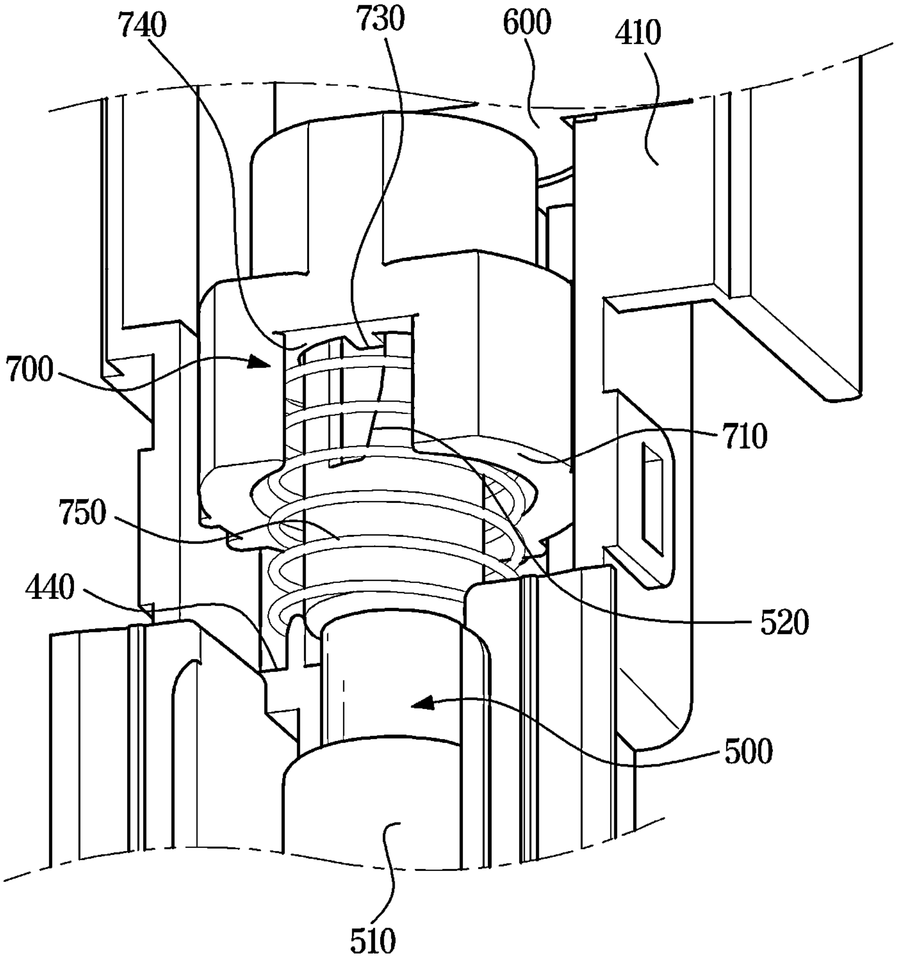
FIG. 12 illustrates a coupling structure of a connector and a latch according to an embodiment of the present disclosure.
Figure 13:
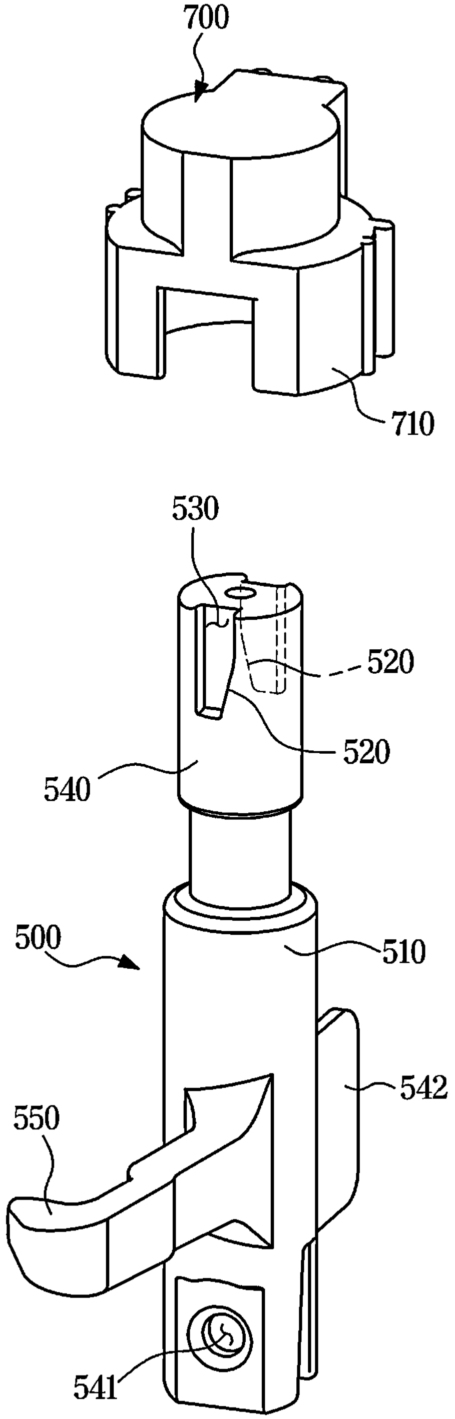
FIG. 13 is a perspective view of the connector and the latch according to an embodiment of the present disclosure.
Figure 14:
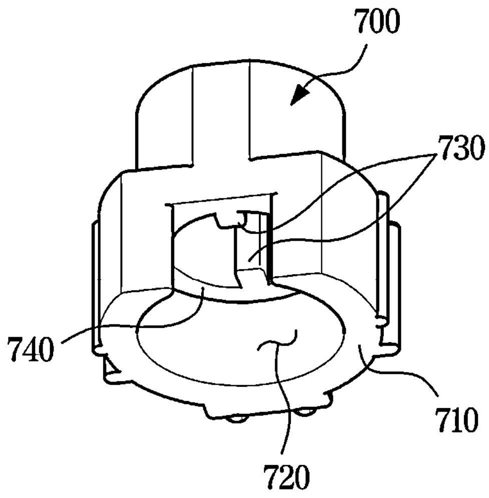
FIG. 14 is another perspective view of the connector and the latch according to an embodiment of the present disclosure.
Figure 14:
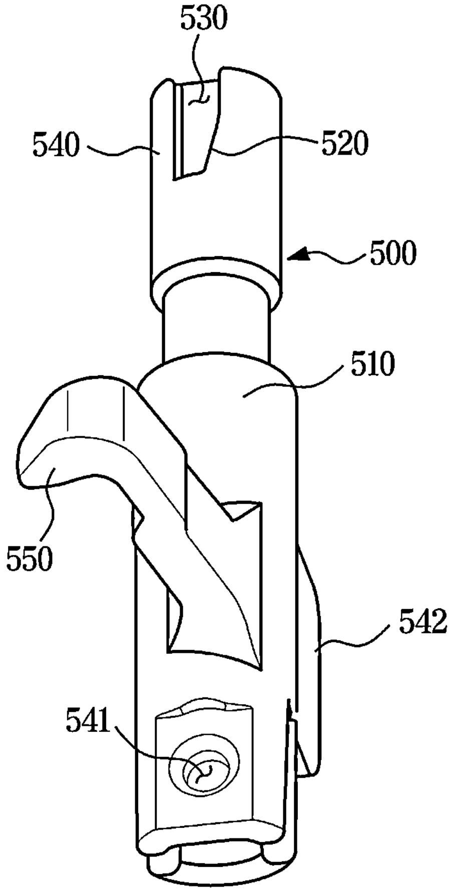

FIG. 8 illustrates a locking device according to an embodiment of the present disclosure. FIG. 9 illustrates a coupling structure of a lever and a connecting rod according to an embodiment of the present disclosure. FIG. 10 is an exploded view illustrating one part of the locking device according to an embodiment of the present disclosure. FIG. 11 illustrates a housing cover separated from a housing of the locking device according to an embodiment of the present disclosure. FIG. 12 illustrates a coupling structure of a connector and a latch according to an embodiment of the present disclosure. FIG. 13 is a perspective view of the connector and the latch according to an embodiment of the present disclosure. FIG. 14 is another perspective view of the connector and the latch according to an embodiment of the present disclosure.

The configuration of the locking device according to an embodiment of the present disclosure will be described with reference to FIGS. 8 to 14.

The locking device 400 may include the latch 500 provided to be rotatable about the latch rotation axis R2, a locking means for locking the outer door 200, the manual unlocking unit provided to manually rotate the latch 500 to unlock the outer door 200, and the automatic unlocking unit provided to automatically rotate the latch 500 to unlock the outer door 200.

The latch 500 may include a latch body part 510 forming the latch rotation axis R2, and a latch hook part 550 protruding from the latch body part 510 to be coupled to the fixer 140 formed in the inner door 100. The latch body part 510 may have a cylindrical shape, and the latch hook part 550 may protrude outward in a radial direction from an outer circumferential surface of the latch body part 510. The latch hook part 550 may be formed to be bent into a hook shape.

The latch 500 may rotate between a locked position 500A (FIG. 16) in which the latch hook part 550 is coupled to the fixer 140 and an unlocked position 500B (FIG. 18) in which the hook part 550 is separated from the fixer 140.

The locking means for locking the outer door 200 may include a latch elastic member 570. The latch elastic member 570 may include a compression spring. The latch elastic member 570 may elastically bias the latch 500 so that the latch 500 directs to the locked position. Therefore, when no external force acts on the latch 500, the latch 500 may be rotated to the locked position by an elastic force of the latch elastic member 570, and the outer door 200 may be in the locked state by coupling the latch hook part 550 and the fixer 140.

One end of the latch elastic member 570 may be supported by the housing 410 of the locking device 400, and the other end of the latch elastic member 570 may be supported by the latch 500 (see FIG. 6). The latch 500 may include a door elastic member support 542 (FIG. 10) to support the latch elastic member 570.

The manual unlocking unit may include the lever 800 provided to be manually manipulated by the user. The lever 800 may be provided at the lower portion of the outer door 200 to be rotatable about the lever rotation axis R3.

The latch 500 may be rotated through the manipulation force applied to the lever 800. The manipulation force applied to the lever 800 may be transmitted to the latch 500 through one end of the latch 500, thereby causing the latch 500 to be rotated. As an example, the manipulation force applied to the lever 800 may be transmitted to the latch 500 through a lower end 512 (FIG. 10) of the latch 500.

The manual unlocking unit may include the connecting rod 900 provided between the lever 800 and the latch 500 to transmit the manipulation force applied to the lever 800 to the latch 500. The connecting rod 900 may be provided to be rotatable about a rod rotation axis R4. The rod rotation axis R4 may be formed on the same line as the latch rotation axis R2. The connecting rod 900 may be coupled to the one end of the latch 500. As an example, the connecting rod 900 may be coupled to the lower end 512 of the latch 500. The connecting rod 900 may be coupled to the latch 500 to rotate together with the latch 500.

The connecting rod 900 may include a rod body part 910 forming the rod rotation axis R4, and a rod extension part 920 extending in the radial direction from the rod body part 910.

The rod body part 910 may include a coupling end 911 coupled to the latch 500. The coupling end 911 may be inserted into and coupled to a portion of the latch 500. The coupling end 911 and the latch 500 may be coupled through a fastening member SS. To this end, a coupling hole 912 may be formed on the coupling end 911, and a coupling hole 541 may be formed on the latch 500.

The connecting rod 900 may include a connecting pin 930 provided on the rod extension part 920 so that the lever 800 is coupled thereto. The connecting pin 930 may be formed at an eccentric position on the rod rotation axis R4.

The lever 800 may include the lever shaft 810 forming the lever rotation axis R3, the lever handle 820 protruding from the lever shaft 810 so that the lever handle may be manipulated by the user, and a pin coupling part 830 provided to be coupled to the connecting pin 930.

With this configuration, when the user applies the physical manipulation force to the lever 800 through the lever handle 820, the lever 800 may be rotated about the lever rotation axis R3, and the manipulation force may be transmitted to the connecting rod 900 through the pin coupling part 830 and the connecting pin 930. That is, a rotational movement of the lever 800 centered on the lever rotation axis R3 may be converted into a rotational movement of the connecting rod 900 centered on the rod rotation axis R4.

Because the connecting rod 900 is coupled to the latch 500 to rotate together with the latch 500, the latch 500 may be rotated according to the rotation of the connecting rod 900.

With this configuration, the latch 500 may be rotated from the locked position to the unlocked position by the manipulation force of the user, and accordingly, the latch 500 may be separated from the fixer 140 and the outer door 200 may be unlocked.

When the manipulation force of the user applied to the lever 800 disappears, the latch 500 may be rotated to the locked position by the elastic force of the latch elastic member 570. When the latch 500 is rotated to the locked position, conversely, a rotational movement of the latch 500 may be converted into the rotational movement of the lever 800 through the connecting pin 930 and the pin coupling part 830.

The automatic unlocking unit may include a driving source 1000 configured to generate a driving force based on an unlocking signal being input to the input unit 50. The refrigerator 1 may include a controller configured to control an operation of the driving source 1000 based on a signal input to the input unit 50. The input unit 50 may receive a user input and transmits the user input to the controller, and the controller may process the user input, so the driving source 1000 may be operated. The refrigerator may include a communication unit for communication with an external device. The controller may also control the operation of the driving source 1000 by receiving the unlock signal of the user from the external device through the communication unit.

The latch 500 may be rotated through the driving force generated from the driving source 1000. The driving force generated from the driving source 1000 may be transmitted to the latch 500 through the other end of the latch 500. As an example, the driving force may be transmitted to the latch 500 through an upper end 511 (FIG. 10) of the latch 500.

The automatic unlocking unit may include the pusher 600 provided to move linearly along the latch rotation axis R2 through a driving force, and the connector 700 provided to move linearly between a base position 700A (FIG. 15) and an advanced position 700B (FIG. 19) according to a linear movement of the pusher 600. As the connector 700 moves from the base position to the advanced position, the connector 700 may press the latch 500. The latch 500 may be rotated from the locked position to the unlocked position by the pressing of the connector 700.

According to one embodiment, the pusher 600 and the connector 700 may be formed separately. In this case, the automatic unlocking unit may include a connector elastic member 750 provided to elastically bias the connector 700 to the base position. The connector elastic member 750 may include a compression spring. One end of the connector elastic member 750 may be supported by the connector 700, and the other end of the connector elastic member 750 may be supported by the housing 410. The connector 700 may be provided with a connector elastic member support 740 (FIG. 12) provided to support the connector elastic member 750, and the housing 410 may be provided with a connector elastic member support 440 (FIG. 12) provided to support the connector elastic member 750.

The driving source 1000 may be the motor 1010 provided to generate a rotational force. The motor 1010 may be a motor capable of driving in forward and backward directions. The automatic unlocking unit may include the at least one rotation gear 1020 for transmitting the rotational force generated by the motor 1010 to the pusher 600. The at least one rotation gear 1020 may be connected to a motor shaft of the motor 1010 and rotated. The at least one rotation gear 1020 may have the form of a two-stage spur gear to reduce and transmit the rotational force. As an example, the at least one rotation gear 1020 may be composed of an upper spur gear and a lower spur gear having a smaller radius than the upper spur gear.

The pusher 600 may include a rack gear 610 to be engaged with the at least one rotation gear 1020 and move linearly along the direction of the latch rotation axis R2. With this configuration, the rotational force of the motor 1010 may be converted into the linear movement of the pusher 600. As an example, when the motor 1010 drives in the forward direction, the pusher 600 may move linearly in a direction of approaching the latch 500, and when the motor 1010 drives in the rearward direction, the pusher 600 may move in the opposite direction.

The pusher 600 may include a pressing part 620 provided to press the connector 700. When the pusher 600 moves in the direction of approaching the latch 500, the pusher 600 may press the connector 700 so that the connector 700 may move linearly from the base position to the advanced position. At this time, the connector elastic member 750 may be compressed to accumulate an elastic force.

Conversely, when the pusher 600 moves in a direction away from the latch 500, the connector 700 may return from the advanced position to the base position by the elastic force of the connector elastic member 750.

According to one embodiment, the pusher 600 and the connector 700 may be formed integrally. In this case, the pusher 600 and the connector 750 may advance and retract together, so the connector elastic member 750 may be omitted.

As the connector 700 moves from the base position to the advanced position, the connector 700 presses the latch 500, so that the latch 500 may be rotated from the locked position to the unlocked position. To this end, the latch 500 may include an inclined surface 520, and the connector 700 may include a connector protrusion 730 provided to press the inclined surface 520.

The inclined surface 520 may be formed on an outer circumferential surface 540 of the latch body part 510. One or more of the inclined surfaces 520 may be formed on the outer circumferential surface 540 of the latch body part 510. The inclined surface 520 may be formed to be inclined with respect to a pressing direction of the connector protrusion 730. That is, the inclined surface 520 may be formed to be inclined with respect to a linear moving direction of the connector 700 or the direction of the latch rotation axis R2.

The connector 700 may include a rotation guide 710 formed to surround the latch body part 510 to guide the rotation of the latch 500. A portion of the latch body part 510 may be accommodated in a guide inner space 720 formed inside the rotation guide 710. The connector protrusion 730 may be formed to protrude from an inner surface of the rotation guide 710. One or more of the connector protrusions 730 may be formed on the inner surface of the rotation guide 710.

With this configuration, when the user inputs the unlock signal into the input unit 50, as the drive motor 1010 rotates in the forward direction, the driving source 1000 may generate a driving force, and the pusher 600 and the connector 700 may move linearly in a direction toward the latch 500 by the generated driving force. That is, the connector 700 may move from the base position to the advanced position, and accordingly, the connector protrusion 730 may press the latch inclined surface 520, so that the latch 500 may be rotated from the locked position to the unlocked position. As the latch 500 is rotated from the locked position to the unlocked position, the latch 500 may be separated from the fixer 140 so that the outer door 200 may be unlocked.

At this time, when the driving motor 1010 of the driving source 1000 rotates in the rearward direction, the pusher 600 and the connector 700 may move linearly in the direction away from the latch 500. That is, the connector 700 may move from the advanced position to the base position, and accordingly, the pressing of the connector protrusion 730 against the latch inclined surface 520 may disappear. As the pressing of the connector protrusion 730 against the latch inclined surface 520 disappears, the latch 500 may be rotated to the locked position by the elastic force of the latch elastic member 570.

According to an embodiment of the present disclosure, the latch 500 may be configured to be rotatable from the locked position to the unlocked position without interfering with the connector 700 when the connector 700 is in the base position. As an example, when the user rotates the latch 500 from the locked position to the unlocked position through the manual unlocking unit, the latch 500 may be rotated from the locked position to the unlocked position without interfering with the connector 700.

To this end, the latch 500 may include an avoidance portion 530 (FIGS. 13, 14, and 16) formed to be recessed on the outer circumferential surface 540 of the latch body part 510 so as not to interfere with the connector protrusion 730.

Specifically, the avoidance portion 530 may be formed to be recessed on the outer circumferential surface 540 of the latch 500 so that the latch 500 does not interfere with the connector protrusion 730 while the latch 500 is rotated from the locked position to the unlocked position by the manipulation force applied by the user to the lever 800 in a state in which the connector 700 is in the base position.

That is, the avoidance portion 530 may be formed to be located in a predetermined rotation direction from the connector protrusion 730 in a state in which the connector 700 is in the base position 700A and the latch 500 is in the locked position 500A. Herein, the predetermined rotation direction is opposite to a direction R in which the latch 500 rotates from the locked position to the unlocked position (see FIG. 16).

With this configuration, because the latch 500 does not interfere with the connector 700 when the user unlocks the outer door 200 through the manual unlocking unit, no load may be applied to the automatic unlocking unit. Therefore, the durability of the motor 1010, the rotation gear 1020, and the like may be improved, and failures may be prevented.

Figure 15:
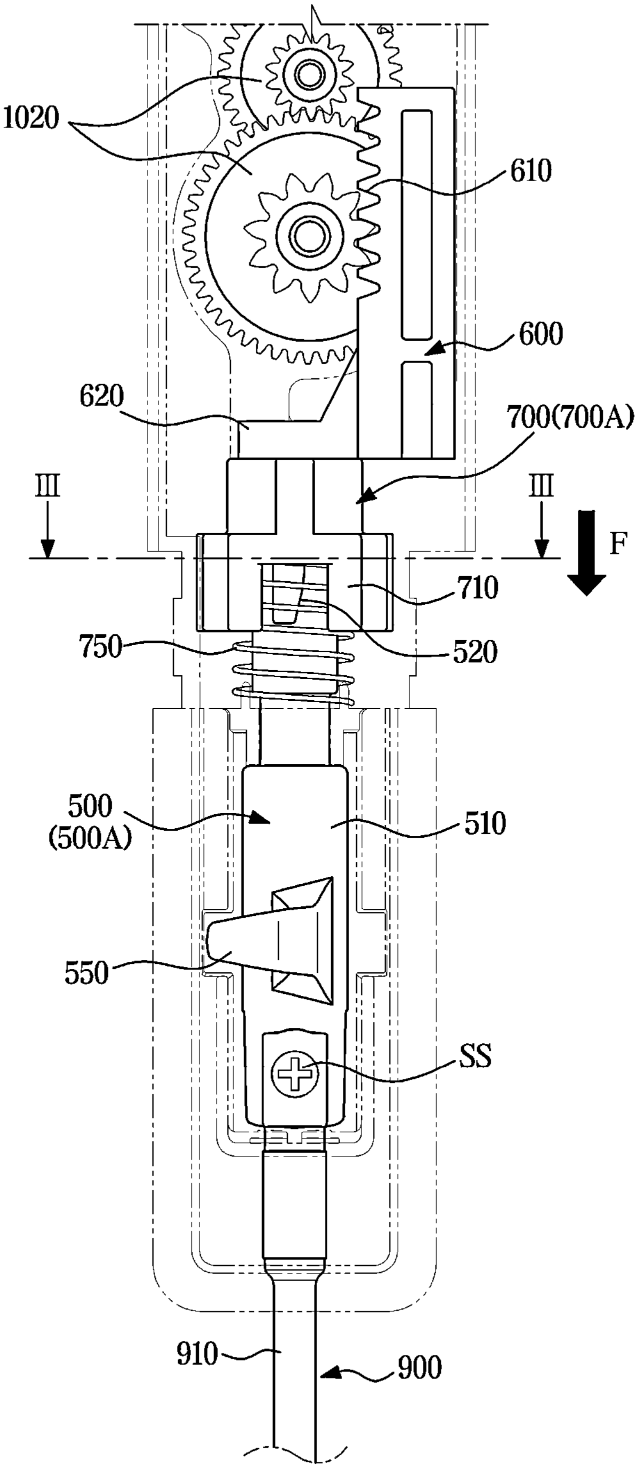
FIG. 15 illustrates a state in which the connector is in a base position and the latch is in a locked position according to one embodiment of the present disclosure.
Figure 16:
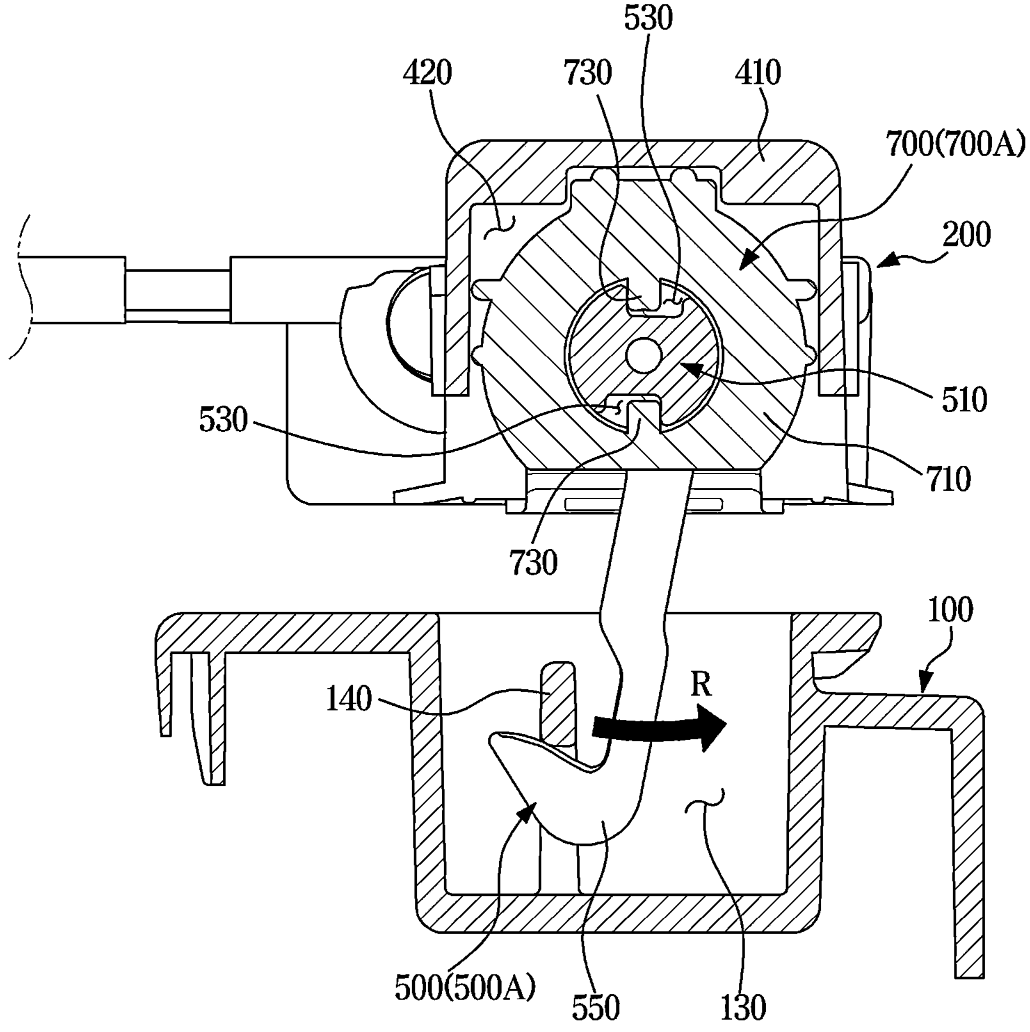
FIG. 16 is a cross-sectional view taken along line III-III in FIG. 15.
Figure 17:
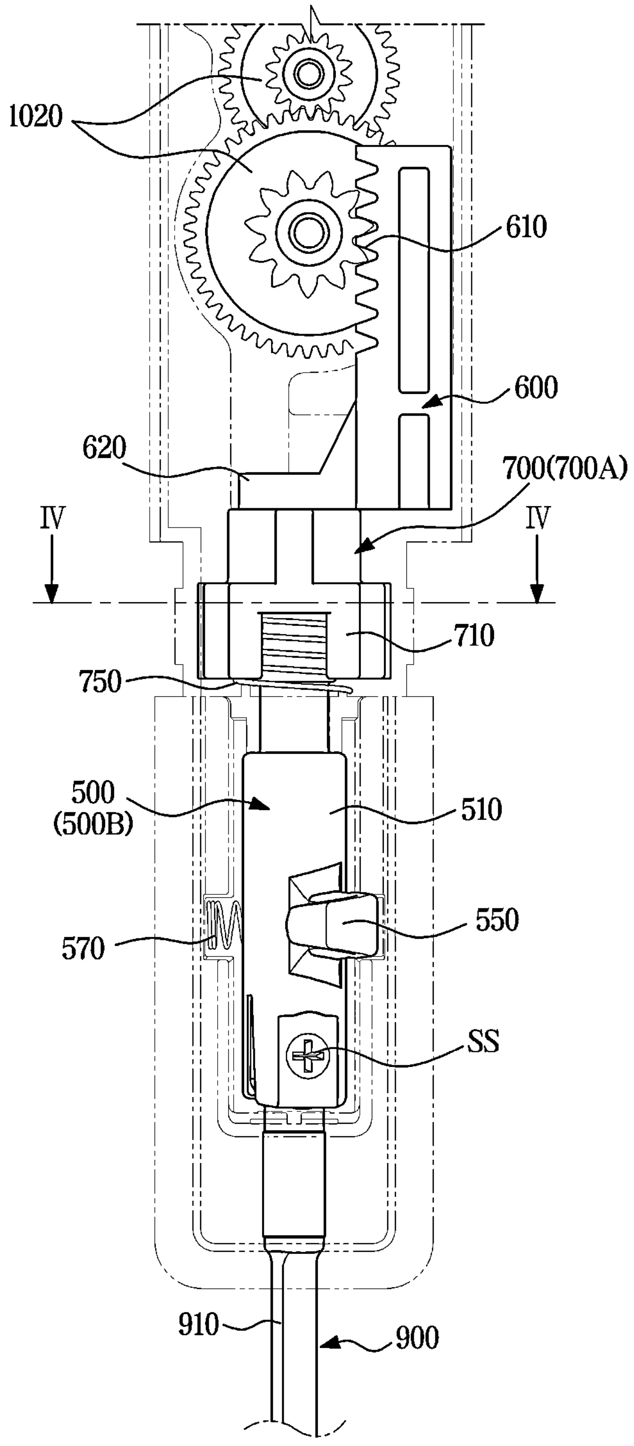
FIG. 17 illustrates a state in which the connector is in an advanced position and the latch is in an unlocked position according to one embodiment of the present disclosure.
Figure 18:
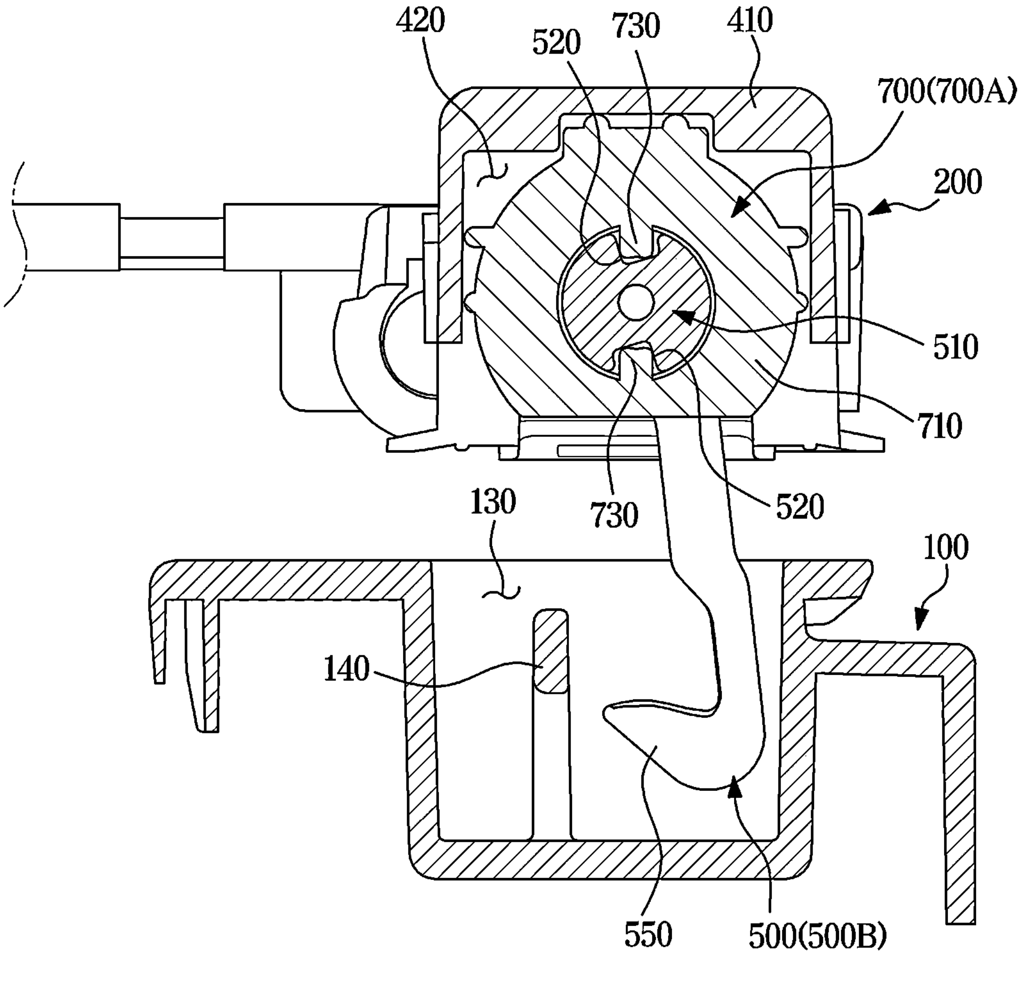
FIG. 18 is a cross-sectional view taken along line IV-IV in FIG. 15.

FIG. 15 illustrates a state in which the connector is in a base position and the latch is in a locked position according to one embodiment of the present disclosure. FIG. 16 is a cross-sectional view taken along line III-III in FIG. 15. FIG. 17 illustrates a state in which the connector is in an advanced position and the latch is in an unlocked position according to one embodiment of the present disclosure. FIG. 18 is a cross-sectional view taken along line IV-IV in FIG. 15.

An operation of the automatic unlocking unit of the locking device according to an embodiment of the present disclosure will be described below with reference to FIGS. 15 to 18, etc.

As illustrated in FIGS. 15 and 16, because the pusher 600 does not press the connector 700 when the driving source does not operate, the connector 700 may be positioned at the base position 700A by the elastic force of the connector elastic member 750. In addition, because the connector 700 is positioned at the base position 700A, the connector protrusion 730 of the connector 700 does not press the inclined surface 520 of the latch 500, so that the latch 500 may be positioned at the locked position 500A by the elastic force of the latch elastic member 570. Therefore, the latch 500 may be coupled to the fixer 140, and the outer door 200 may become in the locked state.

Based on the unlock signal of the user being input to the input unit 50, the motor 1010, which is the driving source 1000, may rotate in the forward direction, and the rotational force of the motor 1010 may cause the linear movement of the pusher 600 through the rotation gear 1020.

The pusher 600 presses the connector 700 while moving linearly, so that the connector 700 may move in a direction F toward the latch 500. That is, the connector 700 may move from the base position 700A to the advanced position 700B by the driving force of the driving source 1000. As the connector 700 moves from the base position 700A to the advanced position 700B, the connector protrusion 730 of the connector 700 presses the inclined surface 520 of the latch 500, so that the latch 500 may be rotated from the locked position 500A to the unlocked position 500B. Accordingly, the latch 500 may be separated from the fixer 140, and the outer door 200 may be in an openable state.

When the outer door 200 is unlocked and is in the openable state, the outer door 200 may be automatically opened by the elastic force of the door elastic member 390 (FIG. 4).

Figure 19:
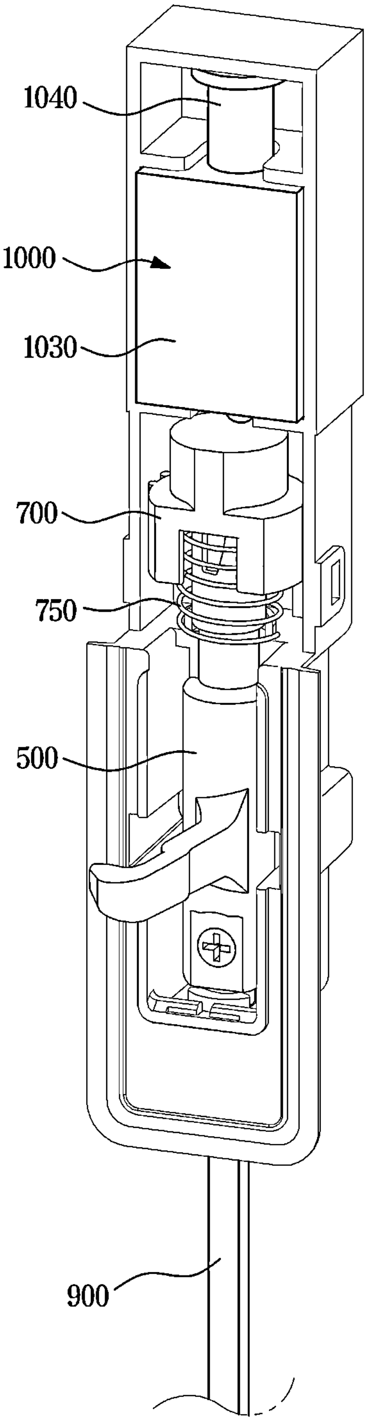
FIG. 19 illustrates a structure in which a solenoid is used as a driving source according to an embodiment of the present disclosure.
Figure 20:
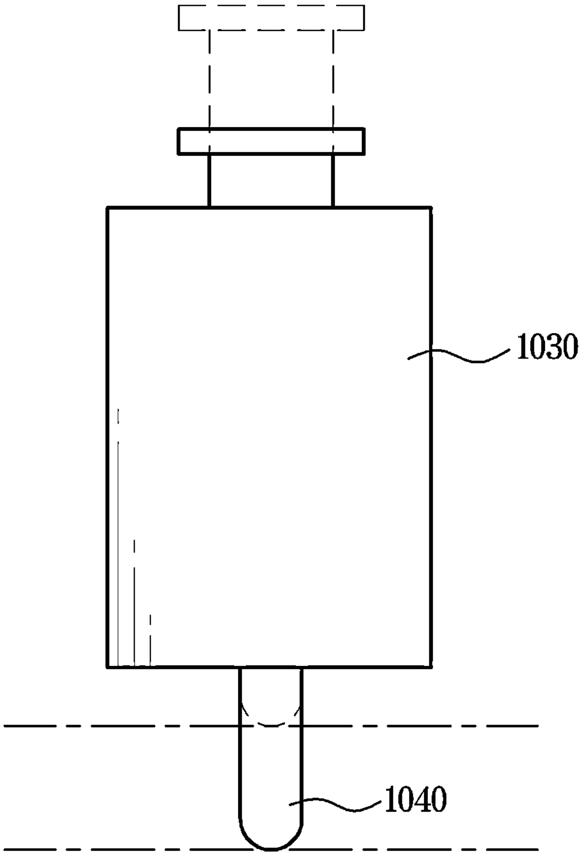
FIG. 20 illustrates an operation of the solenoid in FIG. 19.

FIG. 19 illustrates a structure in which a solenoid is used as a driving source according to an embodiment of the present disclosure. FIG. 20 illustrates an operation of the solenoid in FIG. 19.

A driving source according to an embodiment of the present disclosure will be described below with reference to FIGS. 19 and 20. The same reference numerals are assigned to the same components as those in the above-described embodiment, and descriptions thereof may be omitted.

According to one embodiment, the driving source 1000 may include a solenoid 1030. The solenoid 1030 may include a plunger 1040 provided to move linearly by a magnetic force generated by a coil. The plunger 1040 may be provided to move linearly along the latch rotation axis R2. Depending on the direction of the magnetic force, the plunger 1040 may move linearly in a direction toward the connector 700 or in the opposite direction.

When the solenoid 1030 is used as the driving source 1000, the rotation gear and pusher of the above-described embodiment may be omitted, and the plunger 1040 may be provided to directly press the connector 700.

According to one embodiment, the plunger 1040 and the connector 700 may be formed integrally. In this case, as in the above-described embodiment, the connector elastic member 750 elastically biasing the connector 700 to the base position may be omitted.

Figure 21:
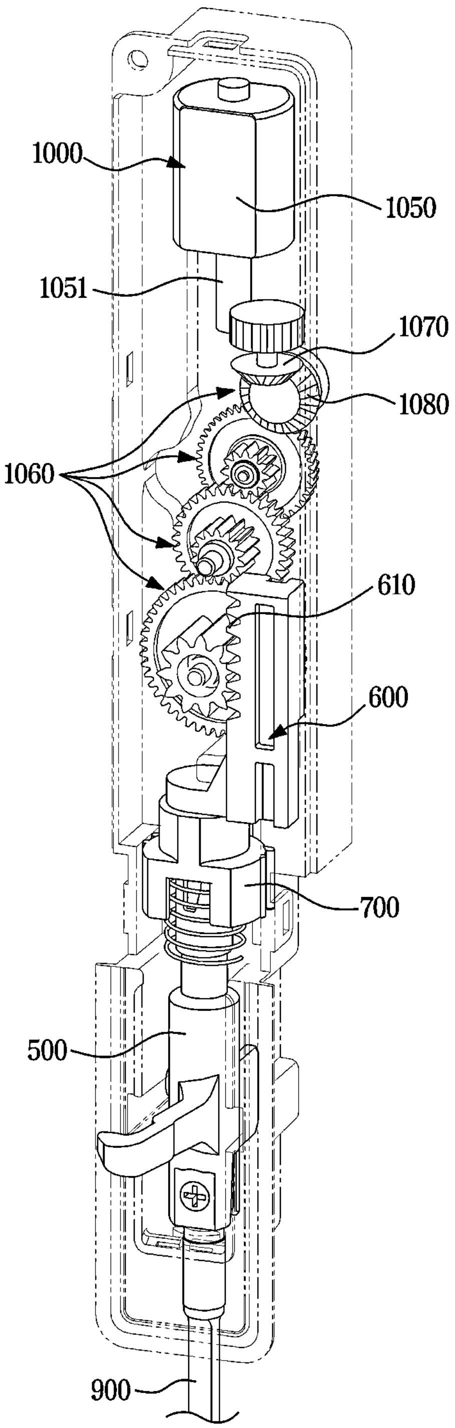
FIG. 21 illustrates a structure in which a bevel gear is applied between a motor and a rack gear according to an embodiment of the present disclosure.

FIG. 21 illustrates a structure in which a bevel gear is applied between a motor and a rack gear according to an embodiment of the present disclosure.

A driving source according to an embodiment of the present disclosure will be described below with reference to FIG. 21. The same reference numerals are assigned to the same components as those in the above-described embodiment, and descriptions thereof may be omitted.

According to one embodiment, the driving source 1000 may include a motor 1050 configured to generate a rotational force. A motor rotation shaft 1051 of the motor 1050 may be parallel to the latch rotation axis R2. The motor 1050 may be a motor capable of driving in the forward and backward directions.

The automatic unlocking unit may include a plurality of rotation gears 1060 for transmitting the rotational force generated by the motor 1050 to the pusher 600. The plurality of rotation gears 1060 may be connected to the motor rotation shaft 1051 of the motor 1050 and rotate.

The plurality of rotation gears 1060 may include bevel gears 1070 and 1080 whose rotation axes intersect each other at right angles.

As such, the direction of the rotation shaft 1051 of the motor 1050 and the arrangement direction of the motor 1050 may be variously selected using the bevel gears 1070 and 1080.

Additionally, according to one embodiment, the motor 1050 may be configured to transmit the rotational force of the motor between right-angled axes that do not intersect each other using a worm and a worm gear.

Although the technical idea of the present disclosure as described above has been described through specific embodiments, the scope of the present disclosure is not limited to these embodiments. Various other embodiments that may be modified or changed by those skilled in the art within the scope of not departing from the gist of the technical idea of the present disclosure specified in the claims will also fall within the scope of the present disclosure.

The invention claimed is:

1. A refrigerator comprising:
- a main body having a storage compartment;
- an inner door having an opening, and being rotatable between a closed position and an open position relative to the storage compartment;
- an outer door in front of the inner door, and being rotatable to open and close the opening in the inner door;
- a locking device on the outer door to lock the outer door to, and unlock the outer door from, the inner door; and
- an input unit to receive a user input from a user to unlock the outer door from the inner door,
- the locking device including:
  - a latch that is rotatable about a latch rotation axis between a locked position in which the outer door is locked to the inner door, and an unlocked position in which the outer door is unlocked from the inner door,
  - a lever configured to be manually manipulatable by the user such that, as the user applies a manipulation force to the lever, the latch rotates from the locked position to the unlocked position,
  - a driving source configured to, based on the user input being received by the input unit, generate a driving force,
  - a pusher that is linearly movable along the latch rotation axis by the generated driving force, and
  - a connector that is linearly movable between a base position and an advanced position by a linear movement of the pusher,
  - wherein the connector is configured such that, as the connector moves from the base position to the advanced position, the connector presses the latch, such that the latch rotates from the locked position to the unlocked position.

2. The refrigerator according to claim 1, wherein
- the inner door includes a fixer,
- the latch includes a latch body part, and a latch hook part protruding from the latch body part such that the latch body part and the latch hook part rotate together about the latch rotation axis with rotation of the latch, and
- the fixer and the latch hook part are configured such that, in the locked position, the latch hook part is coupled to the fixer, and in the unlocked position, the latch hook part is separated from the fixer.

3. The refrigerator according to claim 2, wherein
- the locking device includes a latch elastic member configured to elastically bias the latch to the locked position.

4. The refrigerator according to claim 2, wherein
- the driving force is applied to an end of the latch body part, and
- the manipulation force is applied to another end of the latch body part.

5. The refrigerator according to claim 1, wherein
- the latch includes an inclined surface,
- the connector includes a connector protrusion configured to press the inclined surface, and
- the inclined surface is inclined with respect to a pressing direction of the connector protrusion such that, as the connector protrusion presses the inclined surface, the latch rotates from the locked position to the unlocked position.

6. The refrigerator according to claim 1, wherein the latch is rotatable from the locked position to the unlocked position without interfering with the connector when the connector is in the base position.

7. The refrigerator according to claim 5, wherein
- the latch includes an avoidance portion, and
- the avoidance portion is configured such that, with the connector in the base position, the latch does not interfere with the connector protrusion as the latch is rotated from the locked position to the unlocked position by the manipulation force.

8. The refrigerator according to claim 1, wherein
- the pusher and the connector are separable, and
- the locking device further includes a connector elastic member configured to elastically bias the connector to the base position.

9. The refrigerator according to claim 1, wherein the pusher and the connector are integral.

10. The refrigerator according to claim 1, wherein the driving source includes a motor configured to generate a rotational force, the locking device further includes a rotation gear rotatable by the generated rotational force, and the pusher includes a rack gear engaged with the rotation gear, and the rotation gear and the rack gear are configured such that, as the generated rotational force rotates the rotation gear, the rack gear linearly moves in an axial direction of the latch rotation axis, and thereby linearly moves the pusher.

11. The refrigerator according to claim 1, wherein the driving source includes a solenoid having a plunger configured to be linearly movable by a magnetic force generated by a coil and such that a linear movement of the plunger applies the driving force to the latch.

12. The refrigerator according to claim 1, wherein the locking device further includes a connecting rod between the lever and the latch to transmit the manipulation force from the lever to the latch, and the connecting rod is rotatable together with the latch about the latch rotation axis.

13. The refrigerator according to claim 12, wherein the connecting rod includes:

a rod body part, a rod extension part extending in a radial direction from the rod body part, and a connecting pin at a position eccentric from the latch rotation axis and coupled to the lever such that, as the user applies the manipulation force to the lever, the connecting pin moves and thereby applies the manipulation force to the latch.

14. The refrigerator according to claim 13, wherein the lever is rotatable about a lever rotation axis perpendicular to the latch rotation axis, and the lever includes:

a lever shaft, a lever handle protruding from the lever shaft and configured to be manually manipulated by the user such that the lever shaft and the lever handle rotate together about the lever rotation axis with rotation of the lever handle, and a pin coupling part coupled to the connecting pin and configured such that, as the user applies the manipulation force to the lever, the pin coupling part moves the connecting pin and thereby applies the manipulation force to the latch.

* * * * *